US010723382B2

(12) United States Patent
Mangette

(10) Patent No.: US 10,723,382 B2
(45) Date of Patent: Jul. 28, 2020

(54) HIGH SPEED STRAIGHT AHEAD TILLER DESENSITIZATION

(71) Applicant: Crown Equipment Corporation, New Bremen, OH (US)

(72) Inventor: Stephen Mangette, Delphos, OH (US)

(73) Assignee: Crown Equipment Corporation, New Bremen, OH (US)

( * ) Notice: Subject to any disclaimer, the term of this patent is extended or adjusted under 35 U.S.C. 154(b) by 269 days.

(21) Appl. No.: 15/808,962

(22) Filed: Nov. 10, 2017

(65) Prior Publication Data
US 2018/0201316 A1 Jul. 19, 2018

Related U.S. Application Data

(60) Provisional application No. 62/445,902, filed on Jan. 13, 2017.

(51) Int. Cl.
B62D 15/02 (2006.01)
B60L 15/20 (2006.01)
(Continued)

(52) U.S. Cl.
CPC ........... B62D 15/025 (2013.01); B62D 5/008 (2013.01); B62D 6/002 (2013.01); B66F 9/07568 (2013.01); G05B 13/021 (2013.01)

(58) Field of Classification Search
CPC ........ B62D 15/02; B62D 15/20; B62D 15/04; B62D 61/12; B62D 6/00; B62D 5/04;
(Continued)

(56) References Cited

U.S. PATENT DOCUMENTS 4,595,433 A 6/1986 Ford et al.
4,600,071 A * 7/1986 Kitahara ................. F02B 67/04
180/441
(Continued)

FOREIGN PATENT DOCUMENTS

CN 1695974 A 11/2005
CN 101186207 A 5/2008
(Continued)

OTHER PUBLICATIONS

Rink, Ryan J.; Office Action; U.S. Appl. No. 15/234,120; dated Jul. 20, 2018; United States Patent and Trademark Office, Alexandria, VA.
(Continued)

Primary Examiner — Yuri Kan
(74) Attorney, Agent, or Firm — Stevens & Showalter LLP

(57) ABSTRACT

A method for adjusting the position of a steered wheel of a vehicle includes detecting a steering position value of a steering control device of a vehicle such that the steering position value corresponds to an angular position of the steering control device; calculating a traction speed breakpoint at or above which steering desensitization may occur; and defining a maximum commencement steer angle at or below which steering desensitization may commence. The method also includes determining if the angular position of the steering control device or an angular position of the steered wheel is equal to or less than the maximum commencement steer angle; detecting a traction speed of one of a traction motor or a traction wheel of the vehicle; determining if the traction speed is equal to or above the traction speed breakpoint; and calculating, by the processor, a steering desensitization value when the angular position of one of the steering control device or the steered wheel is equal to or less than the maximum commencement steer angle and
(Continued)

the traction speed is equal to or above the traction speed breakpoint.

26 Claims, 11 Drawing Sheets

(51) Int. Cl.
| | | |
|---|---|---|
| *G06F 17/00* | (2019.01) | |
| *B60K 28/16* | (2006.01) | |
| *B62D 5/04* | (2006.01) | |
| *B66F 9/075* | (2006.01) | |
| *B62D 6/00* | (2006.01) | |
| *B62D 5/00* | (2006.01) | |
| *G05B 13/02* | (2006.01) | |

(58) Field of Classification Search
CPC ........ G06F 17/00; B60W 30/18; B60K 25/00; B60K 28/16; B62L 15/20
See application file for complete search history.

(56) References Cited

U.S. PATENT DOCUMENTS

| | | | |
|---|---|---|---|
| 4,762,194 A * | 8/1988 | Morishita | B62D 5/0457 180/446 |
| 4,942,529 A | 7/1990 | Avitan et al. | |
| 5,258,914 A | 11/1993 | Schmitt | |
| 5,436,836 A | 7/1995 | Holtz et al. | |
| 5,850,616 A | 12/1998 | Matsuno et al. | |
| 6,799,652 B2 | 10/2004 | Nissen et al. | |
| 6,807,471 B2 | 10/2004 | Fujimori | |
| 6,971,470 B2 | 12/2005 | McGoldrick | |
| 7,017,689 B2 | 3/2006 | Gilliland et al. | |
| 7,023,174 B2 | 4/2006 | Fromme et al. | |
| 7,025,157 B2 | 4/2006 | Lindsay et al. | |
| 7,165,643 B2 | 1/2007 | Bozem et al. | |
| 7,278,509 B2 | 10/2007 | Schruder et al. | |
| 7,568,547 B2 | 8/2009 | Yamada et al. | |
| 7,599,776 B2 | 10/2009 | Sonderegger et al. | |
| 7,661,493 B2 | 2/2010 | Rose | |
| 7,665,555 B2 | 2/2010 | Rose et al. | |
| 7,706,947 B2 | 4/2010 | Bozem et al. | |
| 7,784,880 B2 | 8/2010 | Glaeske et al. | |
| 7,849,955 B2 | 12/2010 | Crabill et al. | |
| 7,979,189 B2 | 7/2011 | Nihei | |
| 7,980,352 B2 | 7/2011 | Wetterer et al. | |
| 8,140,228 B2 | 3/2012 | McCabe et al. | |
| 8,172,033 B2 | 5/2012 | Corbett et al. | |
| 8,230,976 B2 | 7/2012 | Baldini | |
| 8,235,161 B2 | 8/2012 | Passeri et al. | |
| 8,395,491 B2 | 3/2013 | Kümmel et al. | |
| 8,412,431 B2 | 4/2013 | Wetterer et al. | |
| 8,452,464 B2 * | 5/2013 | Castaneda | B66F 9/0755 180/19.2 |
| 8,463,511 B2 | 6/2013 | Uematsu et al. | |
| 8,521,384 B2 | 8/2013 | O'Connor et al. | |
| 8,634,986 B2 | 1/2014 | Ghoneim | |
| 8,649,953 B2 | 2/2014 | Sherman | |
| 8,694,194 B2 | 4/2014 | Waltz et al. | |
| 8,718,890 B2 | 5/2014 | Wetterer et al. | |
| 8,731,785 B2 | 5/2014 | McCabe et al. | |
| 8,788,156 B2 | 7/2014 | Nishimura | |
| 8,886,378 B2 | 11/2014 | Hammer et al. | |
| 8,892,294 B2 | 11/2014 | Waltz et al. | |
| 8,918,263 B2 | 12/2014 | Zent et al. | |
| 9,082,293 B2 | 7/2015 | Wellman et al. | |
| 9,184,690 B2 | 11/2015 | Kashima et al. | |
| 9,421,963 B2 | 8/2016 | Wetterer et al. | |
| 9,868,445 B2 | 1/2018 | Mangette et al. | |
| 10,414,288 B2 * | 9/2019 | Mangette | B60L 15/2036 |
| 2003/0079932 A1 | 5/2003 | Ono et al. | |
| 2003/0114970 A1 | 6/2003 | Hara | |
| 2003/0169003 A1 | 9/2003 | Cao et al. | |
| 2005/0027427 A1 | 2/2005 | Nagaya et al. | |
| 2005/0049769 A1 * | 3/2005 | Tsuchiya | B60T 8/1755 701/41 |
| 2005/0072621 A1 | 4/2005 | Hara et al. | |
| 2005/0162114 A1 | 7/2005 | Makaran | |
| 2006/0052927 A1 | 3/2006 | Watanabe et al. | |
| 2006/0065470 A1 | 3/2006 | Manken et al. | |
| 2006/0102397 A1 | 5/2006 | Buck et al. | |
| 2006/0211535 A1 | 9/2006 | Casey | |
| 2007/0007080 A1 | 1/2007 | Manthey et al. | |
| 2007/0175693 A1 | 8/2007 | Krimbacher | |
| 2007/0212680 A1 | 9/2007 | Friedrichs et al. | |
| 2007/0225885 A1 | 9/2007 | Hara et al. | |
| 2007/0295545 A1 * | 12/2007 | Romig | B60W 10/08 180/197 |
| 2009/0194358 A1 | 8/2009 | Corbett et al. | |
| 2009/0222156 A1 | 9/2009 | Krueger et al. | |
| 2009/0314568 A1 * | 12/2009 | Brown | B62K 5/08 180/209 |
| 2010/0025144 A1 | 2/2010 | Huang et al. | |
| 2011/0251762 A1 | 10/2011 | Uematsu et al. | |
| 2012/0123614 A1 | 5/2012 | Laws et al. | |
| 2012/0136539 A1 | 5/2012 | Bryant et al. | |
| 2013/0138290 A1 | 5/2013 | Falkenstein | |
| 2013/0226411 A1 | 8/2013 | Hirano et al. | |
| 2013/0338886 A1 | 12/2013 | Callea et al. | |
| 2014/0143607 A1 | 5/2014 | Vogt et al. | |
| 2014/0163804 A1 | 6/2014 | Kaneko et al. | |
| 2014/0188324 A1 | 7/2014 | Waltz et al. | |
| 2014/0195127 A1 | 7/2014 | Hoffman | |
| 2014/0209406 A1 | 7/2014 | Wetterer et al. | |
| 2014/0277871 A1 | 9/2014 | Goncalves et al. | |
| 2014/0277985 A1 | 9/2014 | Zent et al. | |
| 2014/0278021 A1 | 9/2014 | Fackler et al. | |
| 2015/0032423 A1 | 1/2015 | Tang | |
| 2015/0090507 A1 | 4/2015 | Okada et al. | |
| 2015/0096826 A1 | 4/2015 | Eden et al. | |
| 2015/0158522 A1 | 6/2015 | Thayer | |
| 2015/0274196 A1 | 10/2015 | Park et al. | |
| 2015/0291155 A1 | 10/2015 | Jonsson et al. | |
| 2015/0331061 A1 | 11/2015 | Hirschbold et al. | |
| 2015/0375780 A1 | 12/2015 | Chai et al. | |
| 2016/0016482 A1 | 1/2016 | Lee | |
| 2016/0129803 A1 | 5/2016 | Grewal et al. | |
| 2016/0160470 A1 | 6/2016 | Kishimoto et al. | |
| 2016/0264387 A1 | 9/2016 | Yoon et al. | |
| 2016/0272081 A1 | 9/2016 | Lee | |
| 2016/0289056 A1 | 10/2016 | Castaneda et al. | |
| 2017/0001663 A1 | 1/2017 | Moberg | |
| 2017/0015330 A1 | 1/2017 | Armbruster et al. | |
| 2017/0028993 A1 | 2/2017 | Addison et al. | |
| 2017/0028994 A1 | 2/2017 | Addison et al. | |
| 2017/0029023 A1 | 2/2017 | Otterbein | |
| 2017/0043765 A1 | 2/2017 | Mangette et al. | |
| 2017/0043786 A1 | 2/2017 | Mangette et al. | |
| 2017/0043787 A1 | 2/2017 | Mangette et al. | |
| 2017/0043804 A1 | 2/2017 | Mangette et al. | |
| 2018/0134310 A1 | 5/2018 | Benak et al. | |
| 2018/0141553 A1 * | 5/2018 | Katayama | B60W 10/06 |
| 2019/0100236 A1 | 4/2019 | De Carteret et al. | |

FOREIGN PATENT DOCUMENTS

| | | |
|---|---|---|
| CN | 101977837 A | 2/2011 |
| CN | 102171078 A | 8/2011 |
| CN | 102171083 A | 8/2011 |
| CN | 102218988 A | 10/2011 |
| CN | 102239455 A | 11/2011 |
| CN | 102442222 A | 5/2012 |
| CN | 102549514 A | 7/2012 |
| CN | 103991824 A | 8/2014 |
| CN | 104044637 A | 9/2014 |
| CN | 106170430 A | 11/2016 |
| DE | 4311485 A1 | 10/1994 |
| DE | 19702313 C1 | 4/1998 |
| DE | 10114600 A1 | 1/2002 |
| DE | 10204955 A1 | 8/2002 |
| DE | 10205632 A1 | 10/2002 |
| DE | 10204742 A1 | 7/2003 |

(56) References Cited

FOREIGN PATENT DOCUMENTS

| | | |
|---|---|---|
| DE | 10301435 A1 | 12/2003 |
| DE | 10358907 A1 | 7/2004 |
| DE | 102004001318 A1 | 8/2004 |
| DE | 10354663 A1 | 6/2005 |
| DE | 102004028828 A1 | 1/2006 |
| DE | 102005022089 A1 | 11/2006 |
| DE | 102006035863 A1 | 2/2008 |
| DE | 102006041254 A1 | 3/2008 |
| DE | 102006050506 A1 | 4/2008 |
| DE | 102008012007 A1 | 9/2009 |
| DE | 102010007615 A1 | 9/2010 |
| DE | 102009020157 A1 | 11/2010 |
| DE | 112009004544 T5 | 8/2012 |
| DE | 102011013248 A1 | 9/2012 |
| DE | 102012102459 A1 | 9/2013 |
| DE | 102012209788 A1 | 12/2013 |
| DE | 102013011883 A1 | 1/2015 |
| DE | 10355933 B4 | 4/2015 |
| EP | 0436567 B1 | 10/1992 |
| EP | 1089901 B1 | 1/2002 |
| EP | 1186459 A1 | 3/2002 |
| EP | 1281600 A2 | 2/2003 |
| EP | 1183579 B1 | 10/2004 |
| EP | 1607309 A2 | 12/2005 |
| EP | 1301387 B1 | 3/2006 |
| EP | 0930216 B1 | 7/2006 |
| EP | 1268257 B1 | 7/2006 |
| EP | 1360103 B1 | 8/2006 |
| EP | 1741615 A1 | 1/2007 |
| EP | 1325857 B1 | 5/2007 |
| EP | 1527980 B1 | 12/2009 |
| EP | 2218627 A1 | 8/2010 |
| EP | 1880919 B1 | 5/2011 |
| EP | 1594026 B1 | 7/2011 |
| EP | 2145812 B1 | 11/2011 |
| EP | 1399344 B1 | 8/2012 |
| EP | 2164746 B1 | 8/2012 |
| EP | 2508403 A1 | 10/2012 |
| EP | 204803 A1 | 11/2012 |
| EP | 2172359 B1 | 12/2012 |
| EP | 2551161 A2 | 1/2013 |
| EP | 2368785 B1 | 9/2013 |
| EP | 2483130 B1 | 11/2013 |
| EP | 2664515 A1 | 11/2013 |
| EP | 2582564 B1 | 2/2014 |
| EP | 2374692 B1 | 3/2014 |
| EP | 2630023 B1 | 5/2014 |
| EP | 2674387 B1 | 5/2015 |
| EP | 2613986 B1 | 8/2016 |
| EP | 3078574 A1 | 10/2016 |
| FR | 2862594 A1 | 5/2005 |
| GB | 2042217 A | 9/1980 |
| GB | 2125577 A | 3/1984 |
| GB | 2370819 A | 12/2001 |
| GB | 2391848 A | 2/2004 |
| GB | 2413547 B | 6/2007 |
| GB | 2433791 A | 7/2007 |
| GB | 2425996 B | 1/2009 |
| GB | 2486177 A | 6/2012 |
| GB | 2523462 A | 8/2015 |
| JP | 11310399 A | 11/1999 |
| JP | 2000142065 A | 5/2000 |
| JP | 2003306160 A | 10/2003 |
| JP | 2005253143 A | 9/2005 |
| JP | 2010095354 A | 4/2010 |
| JP | 2010195118 A | 9/2010 |
| JP | 2012254705 A | 12/2012 |
| JP | 2013126868 A | 6/2013 |
| JP | 5418705 B2 | 2/2014 |
| JP | 2014221591 A | 11/2014 |
| KR | 100225961 B1 | 10/1999 |
| KR | 2015004511 A | 1/2015 |
| WO | 2000202389 A1 | 1/2002 |
| WO | 2004098941 A1 | 11/2004 |
| WO | 2011027758 A1 | 3/2011 |
| WO | 2012032133 A1 | 3/2012 |
| WO | 2013006742 A1 | 1/2013 |
| WO | 2013033179 A1 | 3/2013 |
| WO | 2014189877 A1 | 11/2014 |
| WO | 2015152276 A1 | 10/2015 |
| WO | 2015178843 A1 | 11/2015 |
| WO | 2015178845 A1 | 11/2015 |
| WO | 2017030774 A1 | 2/2017 |
| WO | 2017030879 A1 | 2/2017 |

OTHER PUBLICATIONS

Kan, Yuri, Office Action; U.S. Appl. No. 15/808,949; dated Jan. 14, 019; United States Patent and Trademark Office, Alexandria, VA.

Bruce Sheppard; International Search Report and Written Opinion; International Application No. PCT/US2017/060988; dated Feb. 26, 2018; European Patent Office; Rijswijk, Netherland.

Athina Nickitas-Etienne; International Preliminary Report on Patentability; International Application No. PCT/US2016/044981; dated Feb. 20, 2018; International Bureau of WIPO; Geneva, Switzerland.

Mineko Mohri; International Preliminary Report on Patentability; International Application No. PCT/US2016/046456; dated Feb. 20, 2018; International Bureau of WIPO; Geneva, Switzerland.

Mineko Mohri; International Preliminary Report on Patentability; International Application No. PCT/US2016/046460; dated Feb. 20, 2018; International Bureau of WIPO; Geneva, Switzerland.

Simin Baharlou; International Preliminary Report on Patentability; International Application No. PCT/US2016/046466; dated Feb. 20, 2018; International Bureau of WIPO; Geneva, Switzerland.

Janusch, Stefan; International Search Report and Written Opinion; International Application No. PCT/US2016/044981; dated Nov. 9, 2016; European Patent Office; Rijswijk, Netherlands.

Plenk, Rupert; International Search Report and Written Opinion; International Application No. PCT/US2016/046456; dated Nov. 25, 2016; European Patent Office; Rijswijk, Netherlands.

Plenk, Rupert; International Search Report and Written Opinion; International Application No. PCT/US2016/046460; dated Nov. 25, 2016; European Patent Office; Rijswijk, Netherlands.

Plenk, Rupert; International Search Report and Written Opinion; International Application No. PCT/US2016/046466; dated Nov. 25, 2016; European Patent Office; Rijswijk, Netherlands.

Bendidi, Rachid; Notice of Allowance; U.S. Appl. No. 15/234,152; dated Aug. 31, 2017; United States Patent and Trademark Office; Alexandria, Virginia.

Rink, Ryan J.; Office Action; U.S. Appl. No. 15/234,120; dated Nov. 1, 2017; United States Patent and Trademark Office; Alexandria, Virginia.

Luzcando, Gissele; EIC 3600 Search Report; U.S. Appl. No. 15/234,152; dated Aug. 8, 2017; STIC Scientific & Technical Information Center; United States Patent and Trademark Office; Alexandria, Virginia.

Song, Dafeng et al.; "Software-in-the-loop simulation of traction control system"; Nongye Jixie Xuebao (Transactions of the Chinese Society of Agricultural Machinery) 36.8; Aug. 2005; pp. 27-29—Reference is from EIC 3600 Search Report.

Matveev, Alexey S.; "Nonlinear sliding mode control of an unmanned agricultural tractor in the presence of sliding and control saturation"; Robotics and Autonomous Systems; Sep. 2013; pp. 973-987—Reference is from EIC 3600 Search Report.

Keen, Alex et al.; "Improvements to the tractive efficiency of agricultural tractors carrying out cultivations"; American Society of Agricultural and Biological Engineers Annual International Meeting 2009; 7; pp. 4669-4682—Reference is from EIC 3600 Search Report.

Rink, Ryan J.; Office Action; U.S. Appl. No. 15/234,168; dated Nov. 22, 2017; united States Patent and Trademark Office; Alexandria, VA.

U.S. Appl. No. 15/808,949; entitled "Traction Speed Recovery Based on Steer Wheel Dynamic;" filed Nov. 10, 2017 by Stephen Mangette.

Rink, Ryan J.; Office Action; U.S. Appl. No. 15/224,945; dated Jul. 12, 2018; United States Patent and Trademark Office, Alexandria, VA.

(56) References Cited

OTHER PUBLICATIONS

Whalen, Michael F.; Office Action; U.S. Appl. No. 15/224,945; dated Nov. 6, 2019; United States Patent and Trademark Office; Alexandria, Virginia.
Zhu Qixiao; First Office Action; Chinese Application No. 201680045420.9, dated Oct. 28, 2019; China National Intellectual Property Administration; Beijing, China.
Rink, Ryan J.; Final Office Action; U.S. Appl. No. 15/234,120; dated Dec. 28, 2018; United States Patent and Trademark Office, Alexandria, VA.
Kan, Yuri; Notice of Allowance; U.S. Appl. No. 15/808,949; dated May 16, 2019; United States Patent and Trademark Office, Alexandria, VA.
Ryan J. Rink; Final Office Action; U.S. Appl. No. 15/234,120; dated Mar. 28, 2018; United States Patent and Trademark Office; Alexandria, Virginia.
Ryan J. Rink; Notice of Allowance and Fees Due; U.S. Appl. No. 15/234,166; dated Mar. 29, 2018; United States Patent and Trademark Office; Alexandria, Virginia.
Paul Pemberton; International Search Report and Written Opinion; International application No. PCT/US2017/060990); dated Mar. 29, 2018; European Patent Office; Rijswijk, Netherlands.
Ryan J. Rink; Corrected Notice of Allowability; U.S. Appl. No. 15/234,168; dated Apr. 19, 2018; United States Patent and Trademark Office; Alexandria, Virginia.
Whalen, Michael F.; Final Office Action; U.S. Appl. No. 15/224,945; dated Feb. 7, 2019; United States and Trademark Office, Alexandria, VA.
Liu Baojun; First Office Action; Chinese Application No. 201680047909; dated Oct. 31, 2019; State Intellectual Property Office of the People's Republic of China.
Liu Baojun; First Office Action; Chinese Application No. 201680047910..2; dated Nov. 1, 2019; China National Intellectual Property Administration; Beijing, China.
Liu Baojun; First Office Action; Chinese Application No. 201680047915.5; dated Nov. 5, 2019; China National Intellectual Property Administration; Beijing, China.
Australian Examination Report No. 1; Australian Application No. 2016309710; dated Feb. 21, 2020; IP Australia.
Wayne O'Connell; Examination Report No. 1; Australian Patent Application No. 2016309784; dated Mar. 31, 2020; Australian Patent Office; Phillip ACT Australia.
Michael F Whalen, Final Office Action; U.S. Appl. No. 15/224,945; dated May 1, 2020; U.S. Patent and Trademark Office, Alexandria, Virginia.
Yew-Seng How; Examination Report No. 1; Australian Patent Application No. 2016309788; dated Apr. 28, 2020; Australian Patent Office; Phillip ACT, Australia.
Yew-Seng How; Examination Report No. 1; Australian Patent Application No. 2016309785; dated Apr. 29, 2020; Australian Patent Office; Phillip ACT, Australia.
Stephen Mangette; "High Speed Straight Ahead Tiller Desensitization"; U.S. Appl. No. 16/872,756, filed May 12, 2020.
Office Action and Search Report; Chinese Patent Application No. 201780071814.6; dated Apr. 26, 2020; China National Intellectual Property Office; Beijing, China.

\* cited by examiner

| | | Raw Handle Position | STEP 602 | STEP 604 | STEP 606 | STEP 608 | STEP 610 | STEP 612 | STEP 614 | STEP 616 | STEP 620 |
|---|---|---|---|---|---|---|---|---|---|---|---|
| MaxAngleNmbns | 2 | 2 | 6 | 4 | 4 | 1 | 2.35 | 1.35 | 1.35 | 2.35 | 0.8510638 |
| | | 2.2 | 6 | 3.8 | 4 | 0.95 | 2.35 | 1.35 | 1.2825 | 2.2825 | 0.9638554 |
| NmbnsTransAng | 4 | 2.4 | 6 | 3.6 | 4 | 0.9 | 2.35 | 1.35 | 1.215 | 2.215 | 1.0835214 |
| | | 2.6 | 6 | 3.4 | 4 | 0.85 | 2.35 | 1.35 | 1.1475 | 2.1475 | 1.2107101 |
| | | 2.8 | 6 | 3.2 | 4 | 0.8 | 2.35 | 1.35 | 1.08 | 2.08 | 1.3461538 |
| Tlr2DuSF | 2.35 | 3 | 6 | 3 | 4 | 0.75 | 2.35 | 1.35 | 1.0125 | 2.0125 | 1.4906832 |
| | | 3.2 | 6 | 2.8 | 4 | 0.7 | 2.35 | 1.35 | 0.945 | 1.945 | 1.6452442 |
| | | 3.4 | 6 | 2.6 | 4 | 0.65 | 2.35 | 1.35 | 0.8775 | 1.8775 | 1.8109188 |
| Tlr2DuNom | 1 | 3.6 | 6 | 2.4 | 4 | 0.6 | 2.35 | 1.35 | 0.81 | 1.81 | 1.9889503 |
| | | 3.8 | 6 | 2.2 | 4 | 0.55 | 2.35 | 1.35 | 0.7425 | 1.7425 | 2.1807747 |
| | | 4 | 6 | 2 | 4 | 0.5 | 2.35 | 1.35 | 0.675 | 1.675 | 2.3880597 |
| TrxSpd = TrxSpdMax | | 4.2 | 6 | 1.8 | 4 | 0.45 | 2.35 | 1.35 | 0.6075 | 1.6075 | 2.6127527 |
| | | 4.4 | 6 | 1.6 | 4 | 0.4 | 2.35 | 1.35 | 0.54 | 1.54 | 2.8571429 |
| | | 4.6 | 6 | 1.4 | 4 | 0.35 | 2.35 | 1.35 | 0.4725 | 1.4725 | 3.1239389 |
| | | 4.8 | 6 | 1.2 | 4 | 0.3 | 2.35 | 1.35 | 0.405 | 1.405 | 3.4163701 |
| | | 5 | 6 | 1 | 4 | 0.25 | 2.35 | 1.35 | 0.3375 | 1.3375 | 3.7383178 |
| | | 5.2 | 6 | 0.8 | 4 | 0.2 | 2.35 | 1.35 | 0.27 | 1.27 | 4.0944882 |
| | | 5.4 | 6 | 0.6 | 4 | 0.15 | 2.35 | 1.35 | 0.2025 | 1.2025 | 4.4906445 |
| | | 5.6 | 6 | 0.4 | 4 | 0.1 | 2.35 | 1.35 | 0.135 | 1.135 | 4.9339207 |
| | | 5.8 | 6 | 0.2 | 4 | 0.05 | 2.35 | 1.35 | 0.0675 | 1.0675 | 5.4332553 |
| | | 6 | 6 | 0 | 4 | 0 | 2.35 | 1.35 | 0 | 1 | 6 |

FIG. 6B

| | Raw Handle Position | STEP 602 | STEP 604 | STEP 606 | STEP 608 | STEP 610 | STEP 612 | STEP 614 | STEP 616 | STEP 620 |
|---|---|---|---|---|---|---|---|---|---|---|
| MaxAngleNmbns 2 | 2 | 6 | 4 | 4 | 1 | 1.9 | 0.9 | 0.9 | 1.9 | 1.05263158 |
| | 2.2 | 6 | 3.8 | 4 | 0.95 | 1.9 | 0.9 | 0.855 | 1.855 | 1.18598383 |
| NmbnsTransAng 4 | 2.4 | 6 | 3.6 | 4 | 0.9 | 1.9 | 0.9 | 0.81 | 1.81 | 1.32596685 |
| | 2.6 | 6 | 3.4 | 4 | 0.85 | 1.9 | 0.9 | 0.765 | 1.765 | 1.47308782 |
| | 2.8 | 6 | 3.2 | 4 | 0.8 | 1.9 | 0.9 | 0.72 | 1.72 | 1.62790698 |
| Tlr2DuSF | 3 | 6 | 3 | 4 | 0.75 | 1.9 | 0.9 | 0.675 | 1.675 | 1.79104478 |
| 2.35 | 3.2 | 6 | 2.8 | 4 | 0.7 | 1.9 | 0.9 | 0.63 | 1.63 | 1.96319018 |
| | 3.4 | 6 | 2.6 | 4 | 0.65 | 1.9 | 0.9 | 0.585 | 1.585 | 2.14511041 |
| Tlr2DuNom | 3.6 | 6 | 2.4 | 4 | 0.6 | 1.9 | 0.9 | 0.54 | 1.54 | 2.33766234 |
| 1 | 3.8 | 6 | 2.2 | 4 | 0.55 | 1.9 | 0.9 | 0.495 | 1.495 | 2.54180602 |
| | 4 | 6 | 2 | 4 | 0.5 | 1.9 | 0.9 | 0.45 | 1.45 | 2.75862069 |
| TrxSpd = | 4.2 | 6 | 1.8 | 4 | 0.45 | 1.9 | 0.9 | 0.405 | 1.405 | 2.98932384 |
| 0.75 * TrxSpdMax | 4.4 | 6 | 1.6 | 4 | 0.4 | 1.9 | 0.9 | 0.36 | 1.36 | 3.23529412 |
| | 4.6 | 6 | 1.4 | 4 | 0.35 | 1.9 | 0.9 | 0.315 | 1.315 | 3.49809886 |
| | 4.8 | 6 | 1.2 | 4 | 0.3 | 1.9 | 0.9 | 0.27 | 1.27 | 3.77952756 |
| | 5 | 6 | 1 | 4 | 0.25 | 1.9 | 0.9 | 0.225 | 1.225 | 4.08163265 |
| | 5.2 | 6 | 0.8 | 4 | 0.2 | 1.9 | 0.9 | 0.18 | 1.18 | 4.40677966 |
| | 5.4 | 6 | 0.6 | 4 | 0.15 | 1.9 | 0.9 | 0.135 | 1.135 | 4.75770925 |
| | 5.6 | 6 | 0.4 | 4 | 0.1 | 1.9 | 0.9 | 0.09 | 1.09 | 5.13761468 |
| | 5.8 | 6 | 0.2 | 4 | 0.05 | 1.9 | 0.9 | 0.045 | 1.045 | 5.55023923 |
| | 6 | 6 | 0 | 4 | 0 | 1.9 | 0.9 | 0 | 1 | 6 |

FIG. 6C

HIGH SPEED STRAIGHT AHEAD TILLER DESENSITIZATION

RELATED APPLICATION

This application is related to and claims the benefit of provisional patent application entitled "HIGH SPEED STRAIGHT AHEAD TILLER DESENSITIZATION," Application Ser. No. 62/445,902, filed Jan. 13, 2017, the disclosure of which is incorporated by reference herein in their entirety.

FIELD OF THE INVENTION

The present invention relates generally to steering control of a materials handling vehicle, and, more particularly, to controlling steering of a vehicle travelling at a high speed.

BACKGROUND OF THE INVENTION

Forklifts and other types of industrial vehicles are expected to operate under a variety of different conditions. Further, such vehicles typically include a number of different functional systems such as a traction system to control a travelling speed of the vehicle and a steering system to control a direction in which the vehicle travels.

Under various vehicle operating conditions, it may be beneficial to vary the manner in which the traction wheel and steered wheel of the vehicle are controlled to reduce an effect on steering control caused by floor imperfections and the like.

BRIEF SUMMARY OF THE INVENTION

Aspects of the present disclosure relate to a processor implemented method for adjusting the position of a steered wheel of a vehicle. The method includes detecting, by a processor, a steering position value of a steering control device of a vehicle such that the steering position value corresponds to an angular position of the steering control device; calculating, by the processor, a traction speed breakpoint at or above which steering desensitization may occur; and defining, by the processor, a maximum commencement steer angle at or below which steering desensitization may commence, defining the steering range over which the desensitization may be applied, and defining a steering range, above the desensitization range, over which the desensitization may be removed. The method also includes determining, by the processor, when in a nominal state, if the angular position of the steering control device or an angular position of the steered wheel is equal to or less than the maximum commencement steer angle; detecting, by the processor, a traction speed of one of a traction motor or a traction wheel of the vehicle; and determining, by the processor, if the traction speed is equal to or above the traction speed breakpoint. Thus, if the above conditions are present, the method transitions to a desensitized state. While in the desensitized state, the method continues with calculating, by the processor, a steering desensitization value and a wheel angle setpoint based on the calculated steering desensitization value and the angular position of the steering control device; and adjusting a position of the steered wheel of the vehicle based on the calculated wheel angle setpoint.

In particular, calculating the wheel angle setpoint comprises using a look-up table or function having an input value and an output value, wherein the input value is based on the angular position of the steering control device; and the wheel angle setpoint is based on the output value. Furthermore, a modified steering position value is calculated by dividing the angular position of the steering control device value by the steering desensitization value, wherein the input value is the modified steering position value and the output value is the wheel angle setpoint.

In accordance with this aspect, the desensitization value varies based on the traction speed and more particularly, the desensitization value varies in proportion to the traction speed. Also, in accordance with this aspect, a scale factor is used to modify a nominal steering control device-to-wheel ratio to calculate an adjusted steering control device-to-wheel ratio. The desensitization value can be based on the adjusted steering control device-to-wheel ratio multiplied by a quotient that varies based on traction speed. Calculating the desensitization value is performed while the traction speed remains at or above the traction speed breakpoint and the angular position of the steering control device remains below a maximum desensitization angle that is larger than the maximum commencement steer angle.

Also, in accordance with this aspect, the method includes detecting a transition region, by the processor, when the angular position of the one of the steering control device or the steered wheel is above a maximum numbness angle but within a predetermined angular range from the maximum numbness angle. In the transition region, the desensitization value varies in an inverse proportion to the angular position of the one of the steering control device or the steered wheel. The desensitization value also varies in proportion to the traction speed.

Also, in accordance with this aspect, the method also includes determining, by the processor, when in a desensitized state, if the angular position of the steering control device or an angular position of the steered wheel is greater than the maximum desensitization steer angle range; detecting, by the processor, a traction speed of one of a traction motor or a traction wheel of the vehicle; and determining, by the processor, if the traction speed is less than the traction speed breakpoint. Thus, if either of the above conditions are present, the method transitions to a nominal state in which case no desensitization is applied.

Other aspects of the present disclosure relate to a system for adjusting the position of a steered wheel of a vehicle that includes a memory device storing executable instructions; and a processor in communication with the memory device. The processor when executing the executable instructions: detects a steering position value of a steering control device of a vehicle such that the steering position value corresponds to an angular position of the steering control device; calculates a traction speed breakpoint at or above which steering desensitization may occur; and defines a maximum commencement steer angle at or below which steering desensitization may occur. The processor also determines if the angular position of the steering control device or an angular position of the steered wheel is equal to or less than the maximum steer angle; detects a traction speed of one of a traction motor or a traction wheel of the vehicle; and determines if the traction speed is equal to or above the traction speed breakpoint; so that it can calculate a steering desensitization value when the angular position of the steering control device or the angular position of the steered wheel is equal to or less than the maximum commencement steer angle and the traction speed is equal to or above the traction speed breakpoint. Ultimately, the processor calculates a wheel angle setpoint based on the calculated steering desensitization value and the angular position of the steering control device; and a position of the steered wheel of the vehicle is adjusted based on the calculated wheel angle setpoint.

In particular, calculating the wheel angle setpoint comprises using a look-up table or function having an input value and an output value, wherein the input value is based on the steering position value; and the wheel angle setpoint is based on the output value. Furthermore, a modified steering position value is calculated by dividing the steering position value by the steering desensitization value, wherein the input value is the modified steering position value and the output value is the wheel angle setpoint.

In accordance with this aspect, the desensitization value varies based on the traction speed and, more particularly, the desensitization value varies in proportion to the traction speed. Also, in accordance with this aspect, a scale factor is used to modify a nominal steering control device-to-wheel ratio to calculate an adjusted steering control device-to-wheel ratio. The desensitization value can be based on the adjusted steering control device-to-wheel ratio multiplied by a quotient that varies based on traction speed. Calculating the desensitization value is performed while the traction speed remains at or above the traction speed breakpoint and the angular position of the steering control device remains below a maximum desensitization angle that is larger than the maximum commencement steer angle.

Also, in accordance with this aspect, the processor detects a transition region when the angular position of the one of the steering control device or the steered wheel is above a maximum numbness angle but within a predetermined angular range from the maximum numbness angle. In the transition region, the desensitization value varies in an inverse proportion to the angular position of the one of the steering control device or the steered wheel. The desensitization value also varies in proportion to the traction speed.

Also, in accordance with this aspect, the processor detects when the traction speed and/or the angular position of the steering control device or an angular position of the steered wheel do not meet the conditions for desensitization resulting in the system moving from the desensitization state to the nominal state, or being in the nominal state, remaining in the nominal state.

Aspects of the present disclosure relate to a processor implemented method for adjusting the position of a steered wheel of a vehicle. The method includes detecting, by a processor, a steering position value of a steering control device of a vehicle such that the steering position value corresponds to an angular position of the steering control device; calculating, by the processor, a traction speed breakpoint at or above which steering desensitization may occur; and defining, by the processor, a maximum commencement steer angle at or below which steering desensitization may commence, defining the steering range over which the desensitization may be applied, and defining a steering range, above the desensitization range, over which the desensitization may be removed. The method also includes determining, by the processor, when in a nominal state, if the angular position of the steering control device or an angular position of the steered wheel is equal to or less than the maximum commencement steer angle; detecting, by the processor, a traction speed of one of a traction motor or a traction wheel of the vehicle; and determining, by the processor, if the traction speed is equal to or above the traction speed breakpoint. Thus, if the above conditions are present, the method transitions to a desensitized state. While in the desensitized state, the method continues with calculating, by the processor, a steering desensitization value and a wheel angle setpoint based on the calculated steering desensitization value and the angular position of the steering control device; and adjusting a position of the steered wheel of the vehicle based on the calculated wheel angle setpoint.

In embodiments, calculating the wheel angle setpoint comprises using a look-up table or function having an input value and an output value, wherein the input value is based on the angular position of the steering control device, or the steering position value; and the wheel angle setpoint is based on the output value. In embodiments, a modified steering position value is calculated by dividing the angular position of the steering control device value, or the steering position value, by the steering desensitization value. In some such embodiments, the input value of the look-up table or function is the modified steering position value. In embodiments, the output value is the wheel angle setpoint.

In accordance with this aspect, the desensitization value may vary based on the traction speed. More particularly, the desensitization value may vary in proportion to the traction speed. Also, in accordance with this aspect, a scale factor may be used to modify a nominal steering control device-to-wheel ratio to calculate an adjusted steering control device-to-wheel ratio.

The desensitization value may be based on the adjusted steering control device-to-wheel ratio multiplied by a quotient that varies based on traction speed. In embodiments, calculating the desensitization value is performed while the traction speed remains at or above the traction speed breakpoint and the angular position of the steering control device remains below a maximum desensitization angle that is larger than the maximum commencement steer angle.

Also, in accordance with this aspect, the method may include detecting a transition region, by the processor, when the angular position of the one of the steering control device or the steered wheel is above a maximum numbness angle but within a predetermined angular range from the maximum numbness angle. In embodiments, the desensitization value varies in an inverse proportion to the angular position of the one of the steering control device or the steered wheel, and/or the desensitization value varies in proportion to the vehicle speed.

Also in accordance with this aspect, the method may include determining, by the processor, when in a desensitized state, if the angular position of the steering control device or an angular position of the steered wheel is greater than the maximum desensitization steer angle range; detecting, by the processor, a traction speed of one of a traction motor or a traction wheel of the vehicle; and determining, by the processor, if the traction speed is less than the traction speed breakpoint. In embodiments, if either of the above conditions are present, the method transitions to a nominal state in which case no desensitization is applied.

According to a second aspect of the disclosure, there is provided a method for adjusting the position of a steered wheel of a vehicle. The method includes receiving a steering position value from a steering control device of a vehicle such that the steering position value corresponds to an angular position of the steering control device; calculating a traction speed breakpoint at or above which steering desensitization may occur; and defining a maximum commencement steer angle at or below which steering desensitization may commence, defining the steering range over which the desensitization may be applied, and defining a steering range, above the desensitization range, over which the desensitization may be removed. The method may also include determining when in a nominal state, if the steering position value from the steering control device or the angular position of the steered wheel is equal to or less than the maximum commencement steer angle; receiving a traction speed of one of a traction motor or a traction wheel of the vehicle from a traction control module; and determining if the traction speed is equal to or above the traction speed breakpoint. Thus, if the above conditions are present, the method transitions to a desensitized state. While in the desensitized state, the method continues with calculating a steering desensitization value and a wheel angle setpoint based on the calculated steering desensitization value and the angular position of the steering control device; and adjusting a position of the steered wheel of the vehicle based on the calculated wheel angle setpoint. Any features described in relation to the first aspect are equally applicable to the present aspect.

Other aspects of the present disclosure relate to a system for adjusting the position of a steered wheel of a vehicle that includes a memory device storing executable instructions; and a processor in communication with the memory device. The processor when executing the executable instructions: detects a steering position value of a steering control device of a vehicle such that the steering position value corresponds to an angular position of the steering control device; calculates a traction speed breakpoint at or above which steering desensitization may occur; and defines a maximum commencement steer angle at or below which steering desensitization may occur. The processor also determines if the angular position of the steering control device or an angular position of the steered wheel is equal to or less than the maximum steer angle; detects a traction speed of one of a traction motor or a traction wheel of the vehicle; and determines if the traction speed is equal to or above the traction speed breakpoint; so that it can calculate a steering desensitization value when the angular position of the steering control device or the angular position of the steered wheel is equal to or less than the maximum commencement steer angle and the traction speed is equal to or above the traction speed breakpoint. Ultimately, the processor calculates a wheel angle setpoint based on the calculated steering desensitization value and the angular position of the steering control device; and a position of the steered wheel of the vehicle is adjusted based on the calculated wheel angle setpoint.

In particular, calculating the wheel angle setpoint may comprise using a look-up table or function having an input value and an output value, wherein the input value is based on the steering position value; and the wheel angle setpoint is based on the output value. In embodiments, a modified steering position value is calculated by dividing the steering position value by the steering desensitization value. In embodiments, the input value of the look-up table or function is the modified steering position value and/or the output value is the wheel angle setpoint.

In accordance with this aspect, the desensitization value may vary based on the traction speed and, more particularly, the desensitization value may vary in proportion to the traction speed. Also, in accordance with this aspect, a scale factor may be used to modify a nominal steering control device-to-wheel ratio to calculate an adjusted steering control device-to-wheel ratio.

The desensitization value may be based on the adjusted steering control device-to-wheel ratio multiplied by a quotient that varies based on traction speed. Calculating the desensitization value may be performed while the traction speed remains at or above the traction speed breakpoint and the angular position of the steering control device remains below a maximum desensitization angle that is larger than the maximum commencement steer angle.

Also, in accordance with this aspect, the processor may detect a transition region when the angular position of the one of the steering control device or the steered wheel is above a maximum numbness angle but within a predetermined angular range from the maximum numbness angle. In some embodiments, the desensitization value varies in an inverse proportion to the angular position of the one of the steering control device or the steered wheel. In embodiments, the desensitization value varies in proportion to the vehicle speed.

Also, in accordance with embodiments of this aspect, the processor detects when the traction speed and/or the angular position of the steering control device or an angular position of the steered wheel do not meet the conditions for desensitization resulting in the system moving from the desensitization state to the nominal state, or being in the nominal state, remaining in the nominal state.

BRIEF DESCRIPTION OF THE SEVERAL VIEWS OF THE DRAWINGS

FIG. 6B and FIG. 6C depict values from example calculations performed in accordance with FIG. 6A, where the numerical values are not actual handle position values and are used only to illustrate the steps set out in FIG. 6A.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
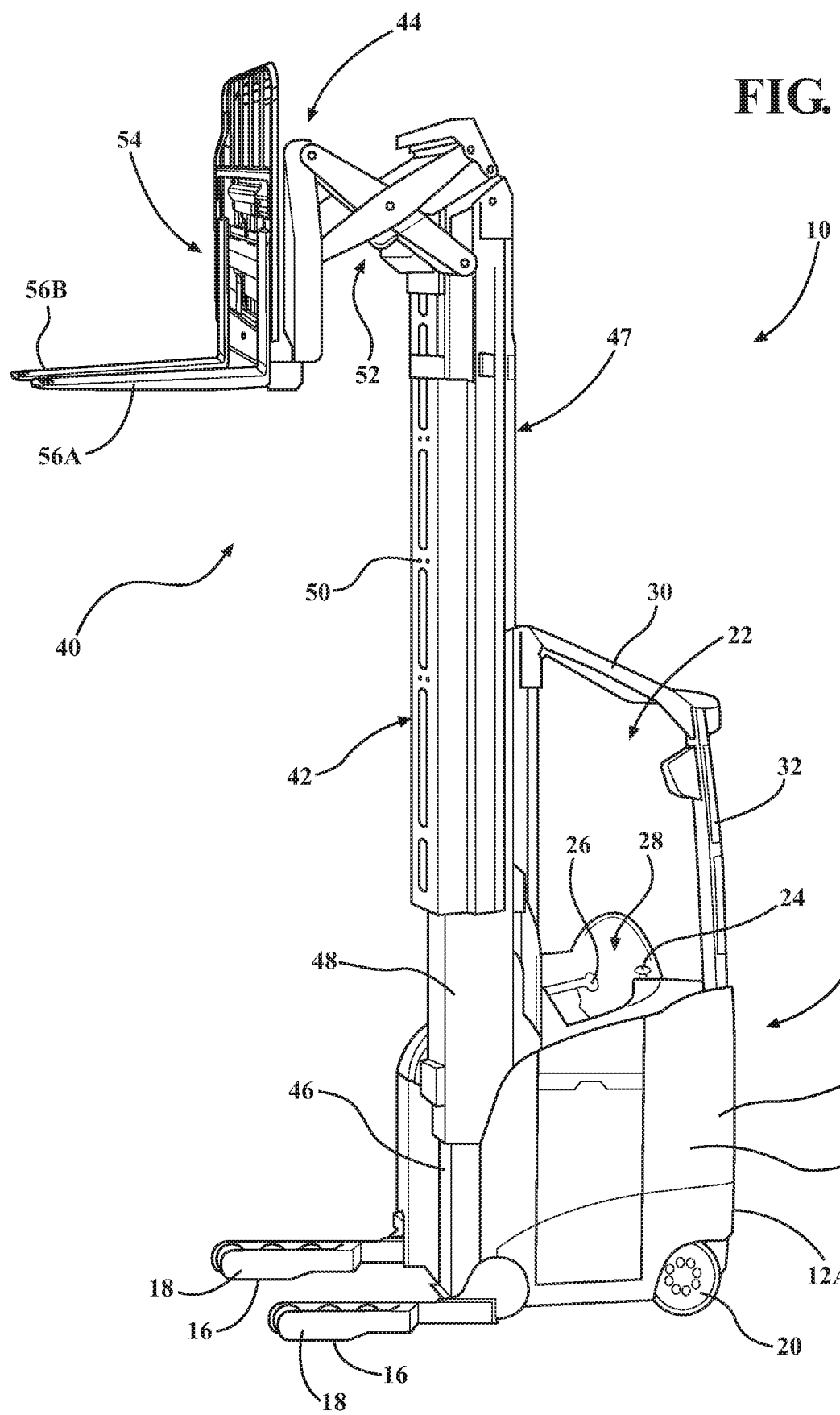
FIG. 1 is a perspective view of a materials handling vehicle according to an aspect of the present disclosure.

Referring now to FIG. 1, a materials handling vehicle 10 (hereinafter "vehicle") is shown. While the present invention is described herein with reference to the illustrated vehicle 10, which comprises a forklift truck, it will be apparent to those skilled in the art that the present invention may be used in a variety of other types of materials handling vehicles.

The vehicle 10 includes a main body or power unit 12, which includes a frame 14 defining a main structural component of the vehicle 10 and which houses a battery 15. The vehicle 10 further comprises a pair of fork-side support wheels 16 coupled to first and second outriggers 18, a driven and steered wheel 20 mounted near a first corner at a rear 12A of the power unit 12, and a caster wheel (not shown) mounted to a second corner at the rear 12A of the power unit 12. The wheels 16, 20 allow the vehicle 10 to move across a floor surface.

An operator's compartment 22 is located within the power unit 12 for receiving an operator driving the vehicle 10. A tiller knob 24 is provided within the operator's compartment 22 for controlling steering of the vehicle 10. The speed and direction of movement (forward or reverse) of the vehicle 10 are controlled by the operator via a multi-function control handle 26 provided adjacent to an operator seat 28, which control handle 26 may control one or more other vehicle functions as will be appreciated by those having ordinary skill in the art. The vehicle 10 further includes an overhead guard 30 including a vertical support structure 32 affixed to the vehicle frame 14.

A load handling assembly 40 of the vehicle 10 includes, generally, a mast assembly 42 and a carriage assembly 44, which is movable vertically along the mast assembly 42. The mast assembly 42 is positioned between the outriggers 18 and includes a fixed mast member 46 affixed to the frame 14, and nested first and second movable mast members 48, 50. It is noted that the mast assembly 42 may include additional or fewer movable mast members than the two shown in FIG. 1, i.e., the first and second movable mast members 48, 50. The carriage assembly 44 includes conventional structure including a reach assembly 52, a fork carriage 54, and fork structure comprising a pair of forks 56A, 56B. A movable assembly 47 as defined herein includes the lower and upper movable mast members 48, 50 and the carriage assembly 44. The mast assembly 42 may be configured as the monomast described in U.S. Pat. No. 8,714,311 to Steven C. Billger et al., granted on May 6, 2014 and assigned to the applicant, Crown Equipment Corporation, the entire disclosure of which is hereby incorporated by reference herein.

The vehicle 10 of FIG. 1 is provided by way of example and many different types of materials handling trucks are contemplated within the scope of the present invention. As described in detail below, aspects of a vehicle control module are provided which allow a number of identical components to be utilized on various vehicles even though the vehicles may be of different types.

Figure 2A:
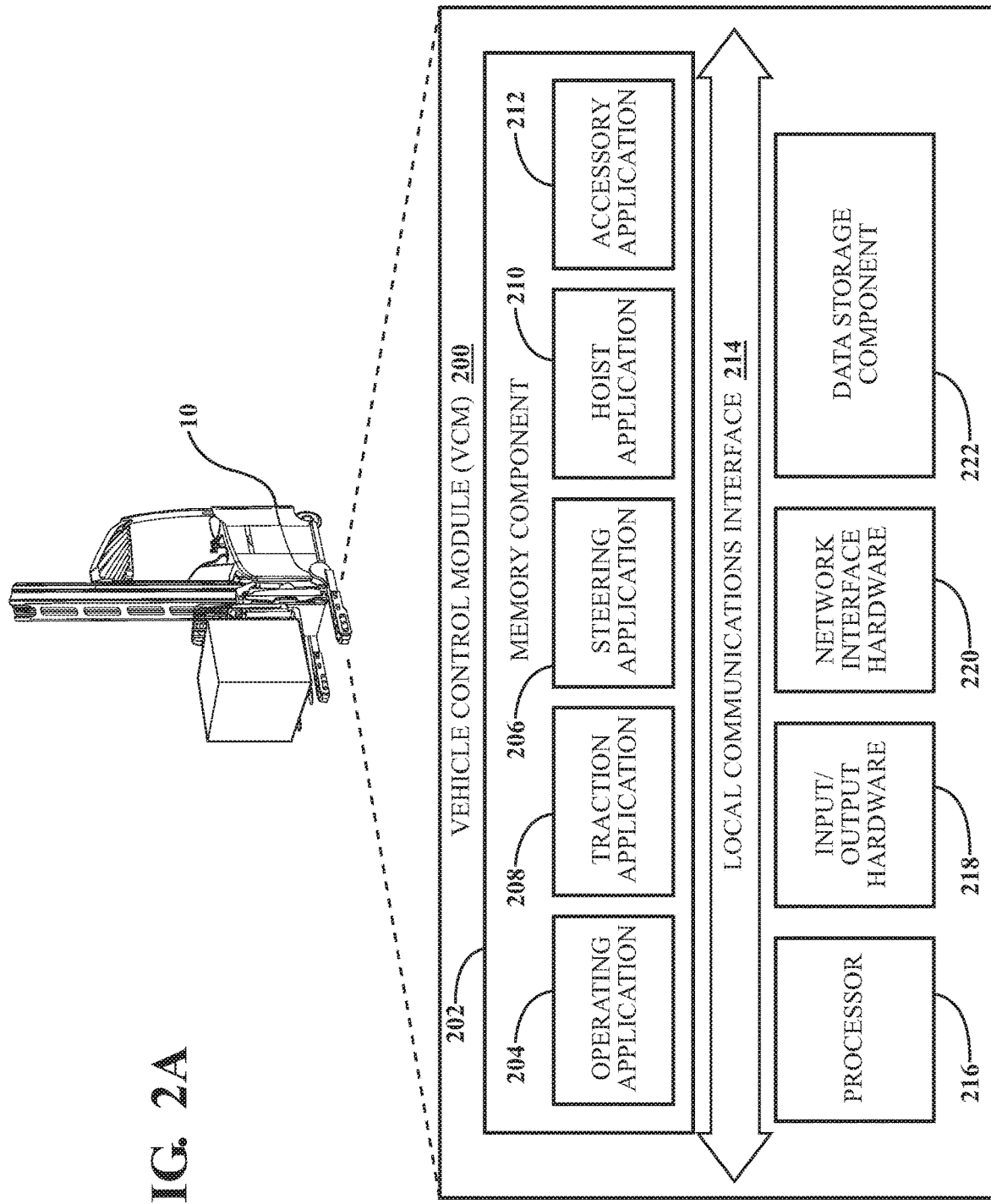
FIG. 2A depicts a computing environment for providing control logic in a vehicle control module (VCM) of the vehicle of FIG. 1.

FIG. 2A depicts a block-level view of a computing environment for providing control logic and software applications in a vehicle control module (VCM) 200, according to one or more embodiments shown and described herein. The vehicle control module 200 and the way it interfaces with various operator controls and other functional systems of the vehicle 10 may be similar to control structure disclosed in U.S. Patent Publication Nos. 2010/0228428 and 2014/0188324, the disclosures of which are incorporated herein by reference in their entireties. The VCM is one of a number of cooperating modules, such as, in addition to a traction control module (TCM) or a steering control module (SCM), that cooperatively control operation of the vehicle 10. Each of the cooperating modules comprise one or more respective processors, memories storing executable program code, and other circuitry configured to perform their individual functions, as well as communicate with one another, as described in detail below. The TCM may also be referred to herein as a "traction controller" and the SCM may also be referred to herein as a "steering controller".

In the illustrated embodiment, the VCM 200 includes one or more processors or microcontrollers 216, input/output hardware 218, network interface hardware 220, a data storage component 222, and a memory component 202. The data storage component 222 and the memory component 202 may each be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Any stored information that is intended to be available after the vehicle 10 is shutdown and restarted may beneficially be stored in non-volatile memory. Also, depending on the particular embodiment, the non-transitory computer-readable medium, mentioned above, may reside within the VCM 200 and/or external to the VCM 200.

Additionally, the memory component 202 may store software or applications that can be executed (i.e., using executable code) by the one or more processors or microcontrollers 216. Thus, the memory component 202 may store an operating application or logic 204, a traction application or logic 208, a steering application or logic 206, a hoist application or logic 210, and accessory application(s) or logic 212. The operating logic 204 may include an operating system and other software such as, for example, diagnostic-related applications for managing components of the VCM 200. The traction application or logic 208 may be configured with one or more algorithms and parameters for facilitating optimal traction control for the vehicle 10. The steering application or logic 206 may be configured with one or more algorithms and parameters for facilitating optimal steering control of the vehicle 10. The hoist application or logic 210 may include one or more algorithms and parameters for facilitating optimal hoist control of the vehicle 10, which acts as the primary load handling assembly system used to raise and lower the moveable assembly 47 of the vehicle 10. Additionally, the accessory application or logic 212 may include one or more algorithms and parameters for providing control of accessories of the vehicle 10 such as an auxiliary load handling assembly system, which performs additional tasks such as tilt and sideshift of the carriage assembly 44. A local communication interface 214 is also included in FIG. 2A and may be implemented as a bus or other communication interface to facilitate communication among the components of the VCM 200.

The one or more processors or microcontrollers 216 may include any processing component operable to receive and execute instructions (such as program code from the data storage component 222 and/or the memory component 202). The processors or microcontrollers 216 may comprise any kind of a device which receives input data, processes that data through computer instructions, and generates output data. Such a processor can be a microcontroller, a hand-held device, laptop or notebook computer, desktop computer, microcomputer, digital signal processor (DSP), mainframe, server, cell phone, personal digital assistant, other programmable computer devices, or any combination thereof. Such processors can also be implemented using programmable logic devices such as field programmable gate arrays (FPGAs) or, alternatively, realized as application specific integrated circuits (ASICs) or similar devices. The term "processor" is also intended to encompass a combination of two or more of the above recited devices, e.g., two or more microcontrollers.

The input/output hardware 218 may include and/or be configured to interface with a monitor, positioning system, keyboard, touch screen, mouse, printer, image capture device, microphone, speaker, gyroscope, compass, and/or other device for receiving, sending, and/or presenting data. The network interface hardware 220 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the VCM 200 and other computing devices including other components coupled with a CAN bus or similar network on the vehicle 10.

It should be understood that the components illustrated in FIG. 2A are merely exemplary and are not intended to limit the scope of this disclosure. While the components in FIG. 2A are illustrated as residing within the VCM 200, this is merely an example. In some embodiments, one or more of the components may reside external to the VCM 200. It should also be understood that while the VCM 200 in FIG. 2A is illustrated as a single device; this is also merely an example. In some embodiments, the traction application 208, the steering application 206, the hoist application 210, and/or the accessory application 212 may reside on different devices. Additionally, while the VCM 200 is illustrated with the traction application 208, the steering application 206, the hoist application 210, and the accessory application 212 as separate logical components, this is also an example. In some embodiments, a single, composite software application may cause the VCM 200 to provide the described functionality.

This application incorporates by reference to each of commonly assigned and co-pending U.S. patent application Ser. No. 15/234,120, filed on Aug. 11, 2016, entitled MODEL BASED DIAGNOSTICS BASED ON TRACTION MODEL; U.S. patent application Ser. No. 15/234,152, filed on Aug. 11, 2016, entitled DIAGNOSTIC SUPERVISOR TO DETERMINE IF A TRACTION SYSTEM IS IN A FAULT CONDITION; and U.S. patent application Ser. No. 15/234,168, filed on Aug. 11, 2016, entitled STEERING AND TRACTION APPLICATIONS FOR DETERMINING A STEERING CONTROL ATTRIBUTE AND A TRACTION CONTROL ATTRIBUTE.

It also should be understood that the VCM 200 may communicate with various sensors and other control circuitry of the vehicle 10 to coordinate the various conditions of manual operation and automatic operation of the vehicle 10.

In the description below, the following terms are used and are intended to convey the following definitions:

steering command signals: sensor output signal values from the operator steering mechanism.

steering position value or raw handle position: signal from the steering control device, corresponds to and defines an angular position of the steering control device.

Wheel_Angle_Cmd: a value generated by the steering application and is a transformation of a digitized value of the steering control input into units that reflect an angle/angular velocity value.

Wheel_Angle_Target, or target steering angle θr: based on the operator's input, this is a value generated by the steering application and provided to the traction application in order to calculate a second $Trx\_Speed\_Limit_2$. Depending on the current operation of a vehicle its value can be one of either the Wheel_Angle_Cmd or a Wheel_Angle.

Wheel_Angle_Limit: a highest allowable steered wheel angle, generated by the steering application based on the measured value of the traction wheel/motor speed and can be used to modify the Wheel_Angle_Setpoint in order to stay within a desired Wheel Angle-to-Traction Speed relationship.

Wheel_Angle_Setpoint, or steering setpoint $\omega_1$ or $\theta_1$: a value generated by the steering application, based on the operator's input, but modified based on traction speed, this is the input sent to the steering control module to effect a change in the steered wheel angle/angular velocity.

Steering feedback ($\omega_2$ or $\theta_2$), or Wheel_Angle: a measured value of the steered wheel angle/angular velocity, generated by the steering control module.

traction speed command signals: a value received from a sensor/actuator that the operator manipulates.

Trx_Speed_Cmd: a value generated by the traction application and is a transformation of the digitized voltage reading of the traction speed control input into units that reflect a speed.

First $Trx\_Speed\_Limit_1$: a highest allowable traction wheel/motor speed for a particular wheel angle value, based on a desired wheel angle-to-traction speed relationship. The first $Trx\_Speed\_Limit_1$ is generated by the steering application and uses a Wheel_Angle_Cmd as a particular wheel angle value. The first $Trx\_Speed\_Limit_1$ is used by the steering application to determine the initial Wheel_Angle_Target and the Wheel_Angle_Setpoint.

Second $Trx\_Speed\_Limit_2$: The second $Trx\_Speed\_Limit_2$ is generated by the traction application and uses a Wheel_Angle_Target as the particular wheel angle value. The second $Trx\_Speed\_Limit_2$ is used by the traction system to slow down the vehicle if necessary to stay within a desired Wheel Angle-to-Traction Speed relationship.

traction speed setting $\omega_4$: a value generated by the traction application, based on the operator's input, but modified based on the $Trx\_Speed\_Limit_2$; this velocity value will eventually be converted to a torque value by the traction application.

traction set point, $\tau_1$: a torque value based on the traction speed setting and the current speed of the vehicle, and is generated by the traction application.

TrxSpd, or speed feedback, $\omega_3$: is a measured value of the traction wheel/motor speed, generated by the traction control module.

traction speed breakpoint TrxSpdBp: traction wheel/motor speed at or above which steering desensitization may occur.

maximum commencement steer angle or maximum initiation angle MaxInitAngle: angle of the handle or angular position of the steered wheel that represents the maximum angle at which the system can enter, or activate desensitization.

maximum angle numbness or maximum numbness angle MaxAngleNmbns: angle of the handle or angular position of the steered wheel that determines when a transition region begins as the handle angle magnitude increases.

numbness transition angle NmbnsTransAng: angle defining a transition region extending from the MaxAngleNmbns angle for an increasing angular region.

Maximum desensitization angle: angle of the handle or angular position of the steered wheel at which the transition region ends, equals the sum of MaxAngleNmbns and NmbnsTransAng.

Figure 2B:
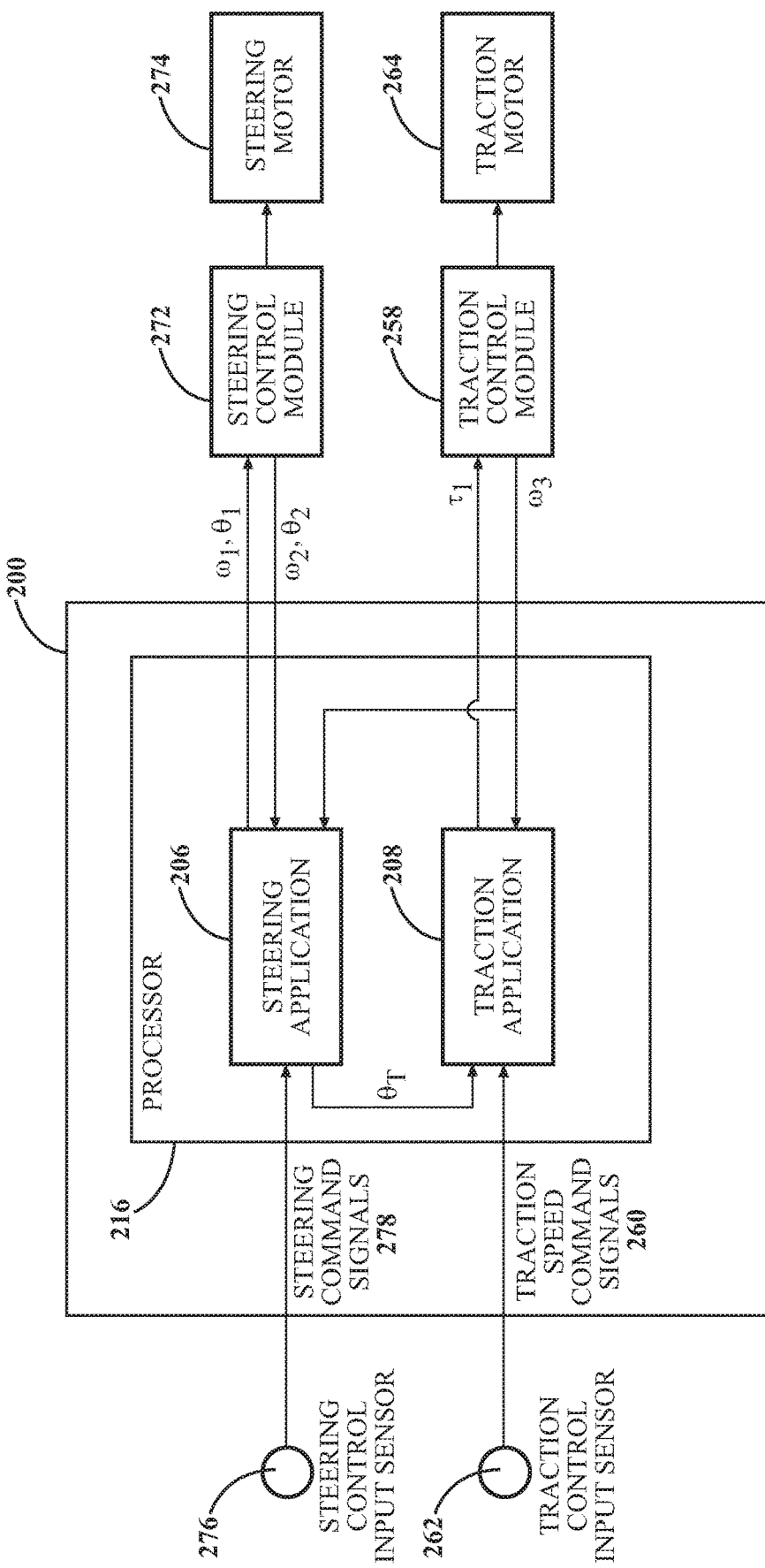
FIG. 2B schematically illustrates selected features of a vehicle and an example vehicle control module that are helpful in describing model-based diagnostic techniques that utilize a traction model in accordance with the principles of the present disclosure.

FIG. 2B schematically illustrates selected features of a vehicle 10 and an example vehicle control module 200 that are helpful in describing vehicle control operations that utilize a traction application and steering application. The other features of the vehicle 10 and the VCM 200 described with respect to FIG. 1 and FIG. 2A are omitted from FIG. 2B so as not to obscure aspects of the example control of vehicle operations described herein.

Referring to FIG. 2B, the VCM 200 includes a processor 216 illustrated to include the steering application 206, the traction application 208 and other applications (not shown) to be executed by the processor 216. In other example embodiments, the VCM 200 can include more than one microcontroller such as a master microcontroller and a slave microcontroller.

In FIG. 2B, an operator-controlled steering control input sensor 276 forming part of a steering control device comprising the tiller knob 24 of the vehicle 10 set out in FIG. 1, provides sensor output signal values defining a steering command signal or signals 278 (e.g., an analog voltage) to the vehicle control module (VCM) 200. The steering control input sensor 276 may also form part of another steering control device comprising a steering wheel, a control handle, a steering tiller or like steering element. The steering command signals 278 may be adjusted or otherwise conditioned and may, for example, be provided to an input pin of the processor 216 within the VCM 200. That signal may be further conditioned and supplied as an input value to the steering application 206 that is being executed by the processor 216. The voltage, for example, of the steering command signals 278, or the rate of change of that voltage, can vary based on the position and the rate of change of position of the steering control input sensor 276 associated with the steering control device, i.e., the tiller knob 24 in the illustrated embodiment. Based on the input signal the steering application 206 receives that corresponds to the steering command signals 278, the steering application 206 determines a setpoint for a control attribute related to the steered wheel 20 of the vehicle. For example, a voltage value can be used along with a lookup table to correlate the voltage value to a particular wheel angle value for a steering setpoint or the rate of change of the voltage could be multiplied by a predetermined scaling factor to convert that rate of change into the setpoint that changes a steering motor angular velocity. Hence, the control attribute may, for example, be a steered wheel angle or an angular velocity of a steering motor 274 and, therefore, a value of the setpoint may be a steered wheel angle $\theta_1$ or a steering motor angular velocity $\omega_1$. The steering setpoint $\omega_1$ or $\theta_1$ can be provided to a steering control module (SCM) 272. The SCM 272 uses the setpoint $\omega_1$ or $\theta_1$ for controlling a steering motor 274 which positions the steered wheel 20 to conform to a desired position as indicated by the operator's manipulation of the steering control input sensor 276. The SCM 272 can also provide a feedback value $\theta_2$ or $\omega_2$ of the control attribute related to the steered wheel. In particular, the feedback value is a measured, or actual, steered wheel angle $\theta_2$ of the steered wheel 20 or is a measured, or actual, angular velocity $\omega_2$ of the steering motor 274. The SCM 272 can, for example, provide the feedback value $\theta_2$ or $\omega_2$ to the steering application 206.

The steering application 206 additionally produces the target steering angle $\theta_T$ or Wheel_Angle_Target which is provided to the traction application 208. A wheel angle/traction speed limiting process can be performed by the steering application 206 and the traction application 208 wherein the steering application 206 determines both:

a) the steering setpoint, or Wheel_Angle_Setpoint, $\omega_1$ or $\theta_1$ and b) the target steering angle, or Wheel_Angle_Target, $\theta_T$.

The target steering angle $\theta_T$ received at the traction application 208 from the steering application 206 serves as a limiting constraint that is converted by the traction application 208 to a traction control speed limit via a predetermined desired speed-to-wheel-angle relationship and is used in the determination of the desired traction speed setting $\omega_4$ and the traction torque setpoint $\tau_1$. The traction wheel speed, or a traction motor speed, can be considered a control attribute related to the traction wheel or driven wheel 20 of the vehicle 10, and the desired traction speed setting $\omega_4$, for either a traction motor 264 or the traction wheel 20, and the traction torque setpoint $\tau_1$, for the traction motor, can be considered to be respective setpoints for this control attribute related to the traction wheel.

The traction torque setpoint $\tau_1$ can be provided to a traction control module (TCM) 258. The TCM 258 uses the traction torque setpoint $\tau_1$ for controlling the operation of the traction motor 264 as discussed further below. The TCM 258 monitors the traction motor 264 and provides a traction feedback speed $\omega_3$ to the traction application 208 and the steering application 206. It may be beneficial in some embodiments to convert the traction speed, or speed feedback, $\omega_3$, to an actual linear speed of the vehicle 10 by the traction application 208. If, for example, the speed feedback $\omega_3$ was an angular speed of the traction motor 264, then the traction application 208 could scale that value to an actual linear speed, $v_3$, of the vehicle 10 based on a) a gearing ratio between the traction motor 264 and the driven wheel 20 and b) the circumference of the driven wheel 20. Alternatively, if the speed feedback $\omega_3$ was an angular speed of the driven wheel 20, then the traction application 208 could scale that value to an actual linear speed, $v_3$, of the vehicle 10 based on the circumference of the driven wheel 20. The linear speed of the vehicle equals the linear speed of the driven wheel 20, presuming there is no slip at the driven wheel.

The traction setpoint $\tau_1$ is determined by the traction application 208 using a Trx_Speed_Cmd which is generated by the traction application 208 and is based on traction speed command signals 260 received from an operator controlled traction speed control input sensor 262, such as the multi-function control handle 26 of the vehicle 10, and the target steering angle $\theta_T$ output from the steering application 206. The traction setpoint $\tau_1$ is output from the traction application 208 to the TCM 258 as a torque value which results in a corresponding speed of a traction motor 264 under the control of the TCM 258.

It is beneficial to have a sensitive steering mechanism in a vehicle to achieve an expected amount of performance and maneuverability in order to pilot the vehicle around its intended environment. However, under some circumstances, such as, for example, during high speed transport cycles in which the travel path is substantially a straight line, little or no steering movement may be required and, in fact, little or no steering deviation may be desirable. During such high speed travel, the effects of floor surface imperfections can be magnified causing operator movement which operator movement is transferred to the steering control device causing inadvertent steering motion. Accordingly, in accordance with the principles of the present disclosure, high speed steering desensitization can be used to numb or reduce the effect of the inadvertent steering motion of the steering control device.

Typically, for a power steering system whose input command mechanism, or steering control device, is decoupled from the steered wheel, there is a mapping, or ratio, that exists between the motion of the steering control device and the motion of the steered wheel. This ratio determines the amount of motion the steered wheel realizes based on an amount of motion a driver imparts on the steering control device. As described below, this ratio is referred to as the "tiller-to-wheel" ratio.

Conceptually, this "tiller-to-wheel" ratio corresponds to a scaling factor by which a steering control device angle can be multiplied to arrive at an associated steered wheel angle. If, for example, the steering control device is a tiller that moves between +/−60 degrees to effect corresponding movement between +/−90 degrees of the steered wheel, then the "tiller-to-wheel" ratio would be 90/60 or 1.5. Furthermore, if, for example, the amount the steered wheel is allowed to move during relatively higher speeds is also limited to +/−60 degrees, then the "tiller-to-wheel" ratio would be 60/60 or 1.0. One or more lookup tables may be built each using a scaling factor corresponding to a design tiller-to-wheel ratio such that input of a steering control device position or angle into the table results in a table output of a corresponding steered wheel position or angle for a steering setpoint. One or more equations or functions each based on a scaling factor corresponding to a design tiller-to-wheel ratio may also be used to determine a steered wheel position or angle based on a steering control device position or angle. For example, a first look up table may be built using a scaling factor of 1.0 for use during high traction speed operation of the vehicle, i.e., a high speed mode, while a second lookup table may be built using a scaling factor of 1.5 for use during low speed operation of the vehicle, i.e., a low speed mode. A speed selection switch (not shown) may be provided and is capable of being toggled between a high speed position corresponding to the high speed mode and a low speed position corresponding to a low speed mode. The first lookup table is used when the switch is in the high speed position and the second lookup table is used when the switch is in the low speed position.

Varying the actual tiller-to-wheel ratio, defined as the real ratio of the steering control device position or angle to the steered wheel position or angle, causes the steered wheel to be more or less sensitive to motion of the steering control device. In particular, at high travel speeds, when the operator is most affected by disturbances due to floor imperfections, the sensitivity of the steering control device can be reduced in accordance with the present invention so as to reduce movement of the steered wheel.

As described herein, the system and process for implementing desensitization of the steering control device to reduce the amount of resulting movement of the steered wheel relies on both the vehicle or traction speed and the handle angle. The system and process determines actual vehicle or traction speeds and handle angles that activate, deactivate, and determine the amount of desensitization.

As used herein, the phrase "steered wheel position" generally refers to an angle between a current position of the steered wheel and a reference axis, wherein the reference axis may be parallel or collinear with a straight line vehicle path such that the steered wheel position is 0 degrees when the vehicle is moving along the straight line path. Thus, "steered wheel position" and "steered wheel angle" can be used interchangeably. As used herein, the phrase "tiller position" or "handle position" generally refer to an angle between a current position of the tiller/handle (or steering control device) and a reference axis or point, wherein the reference axis may be parallel or collinear with a straight line vehicle path and the reference point may fall on that straight line vehicle path such that tiller position/handle position/steering control device position is 0 degrees when the tiller/handle/steering control device is centered or positioned at a 0 degree angle relative the reference axis or point. Thus, "tiller/handle position" and "tiller/handle angle" can be used interchangeably. The term "raw handle angle" refers to a steering position value that is received from the steering control device. The term "processed handle angle" refers to a value that has been manipulated according to the desensitization logic in accordance with the principles of the present disclosure.

Aspects of the present disclosure relate to a processor implemented method for adjusting the position of a steered wheel of a vehicle, by adjusting the ratio between the steering control device and the steered wheel, when the traction speed and wheel angle values meet predefined conditions. When the predefined conditions become satisfied, the system commences desensitization, or in other words, moves from a nominal state to a desensitized state. In an opposite fashion, when the predefined conditions expire, the system removes the desensitization, or in other words, moves from a desensitized state to a nominal state. In this manner, the control device-to-wheel ratio may move from nominal to desensitized, and back, repeatedly as conditions vary.

As mentioned above, the steering application 206 determines a setpoint for a control attribute related to the steered wheel 20 of the vehicle based on the input signal the steering application 206 receives that corresponds to the steering command signals 278. For example, the voltage value from the steering control device, i.e., the tiller knob 24 in the illustrated embodiment, can be conditioned before being used with a lookup table or other function, as discussed above, that correlates the voltage value to a particular steered wheel angle value for a steering setpoint. The voltage or steering position value from the steering control device corresponds to and defines an angular position of the steering control device and is referred to herein as a raw handle position. In accordance with the principles of the present disclosure, the raw handle position is adjusted to a different, processed handle position and, then the processed handle position is used to determine the steering setpoint, which effectively varies or modifies the design tiller-to-wheel ratio of the vehicle designed into the lookup table, equation or function.

Figure 3A:
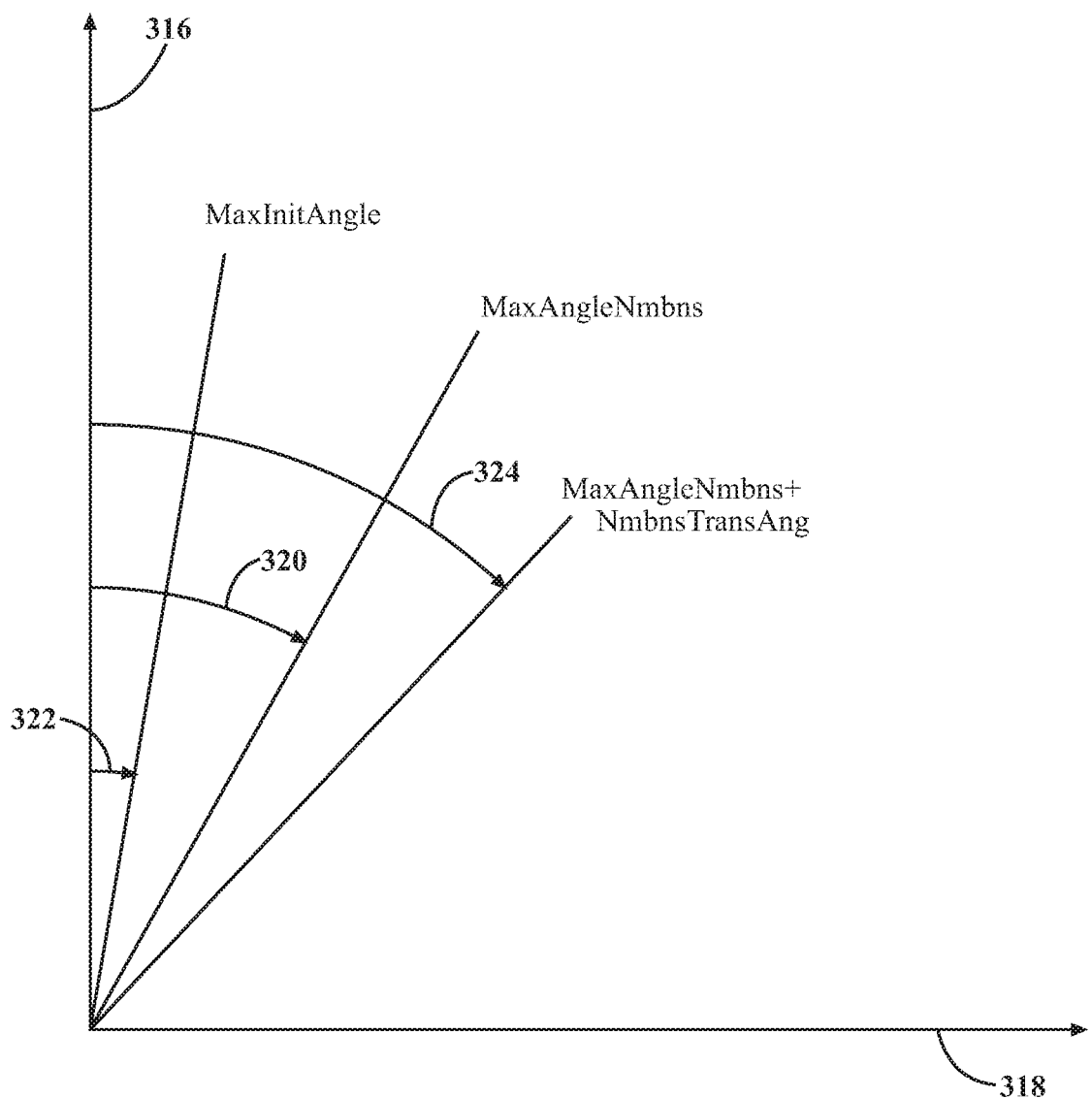
FIG. 3A illustrates three predetermined angle parameters in accordance with the principles of the present disclosure.

FIG. 3A depicts three handle angles utilized in implementing the desensitization logic in accordance with the principles of the present disclosure; each of the angles is measured relative to vertical axis 316 and, therefore, increase as the handle angle approaches the horizontal axis 318. In the illustrated embodiment, the vertical axis is collinear with the reference axis, which, as noted above, may be parallel or collinear with a straight line vehicle path such that tiller position/handle position/steering control device position is 0 degrees when the tiller/handle/steering control device is centered or positioned at a 0 degree handle angle relative the reference axis. Handle angles can occur to the left of the vertical axis 316 as well and represent negative values between 0 and −90 degrees. When appropriate, the absolute value of the handle angle can be used when making comparisons of the angles to various predetermined thresholds.

Angle 322 is an angle of the handle that represents the maximum angle at which the system can enter, or activate desensitization and can be referred to as a maximum commencement steer angle or a maximum initiation angle MaxInitAngle. For example, desensitization can be activated when the magnitude of the angle of the handle is at or below the maximum initiation angle 322 and the vehicle traction speed TrxSpd reaches or exceeds a traction speed breakpoint TrxSpdBp as discussed more fully below. An alternative example is when the vehicle TrxSpd is at or above the traction speed setpoint TrxSpdBp but the magnitude of the angle of the handle is greater than the maximum initiation angle MaxInitAngle. Under those circumstances, desensitization is activated as the handle angle magnitude decreases so as to reach the maximum initiation angle MaxInitAngle. Angle 320 is an angle of the handle that determines when a transition region begins as the handle angle magnitude increases and can be referred to as maximum angle numbness MaxAngleNmbns (also referred to herein as the "maximum numbness angle"). The transition region extends from the MaxAngleNmbns angle for an increasing angular region defined by an angle referred to as numbness transition angle NmbnsTransAng. Thus, angle 324 represents an end to the transition region and equals the sum of MaxAngleNmbns and NmbnsTransAng. Angle 324 is referred to herein as a "maximum desensitization angle." By way of example, MaxInitAngle can be between about 0.5 to 1.5 degrees, MaxAngleNmbns can be between about 9.0 and 11.0 degrees, and NmbnsTransAng can be between about 1.5 to 2.5 degrees such that maximum desensitization angle 324 can be between about 10.5 and 13.5 degrees. The qualifying term "about" in the previous sentence contemplates discrepancies of +/−0.1 degrees. Further, alternative angle sizes for any or all three of the angles 320, 322, 324 are contemplated within the scope of the present disclosure.

Figure 3B:
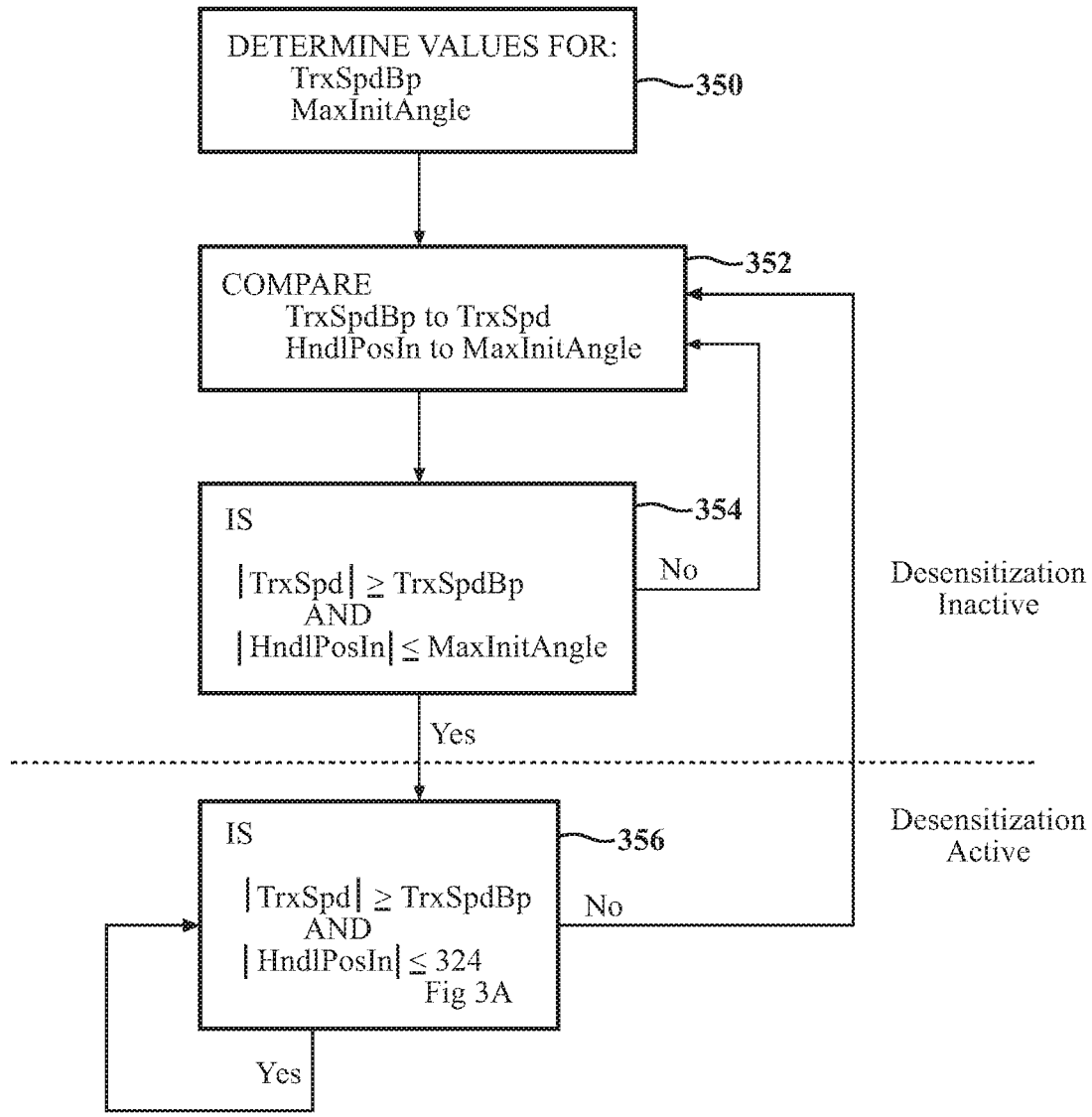
FIG. 3B is a flowchart of an example method of determining whether or not the current vehicle conditions are sufficient to activate/deactivate steered wheel desensitization in accordance with the principles of the present disclosure.

FIG. 3B is a flowchart of an example method of determining whether or not the current vehicle conditions are sufficient to activate/deactivate steered wheel desensitization in accordance with the principles of the present disclosure. In step 350, a value for both a traction speed breakpoint TrxSpdBp and a maximum commencement angle MaxInitAngle 322 may be determined.

For example, to determine a traction speed breakpoint TrxSpdBp, a table may be available in memory within, or accessible by, the VCM 200 that stores different allowable speeds for the vehicle. For example, the table may include speed limit values that vary based on, for example, a current load present on the vehicle, a current steered wheel angle, a height of the forks of the vehicle, any fault conditions, and other factors readily recognized by one of ordinary skill in this field of endeavor. In this way, the maximum achievable speed of the vehicle when it is heavily loaded may be lower than the maximum achievable speed when the vehicle is not carrying any load. One of the traction speed limit values (e.g., the largest speed limit value, maximum traction speed TrxSpdMax) may be selected from the table and multiplied by a scale factor between 0 and 1 to determine a value corresponding to a traction speed breakpoint TrxSpdBp. Thus, if the largest speed limit value TrxSpdMax is, for example, "50" and the scale factor is "0.7", then TrxSpdBp="35".

In step 352, the TrxSpdBp is compared to the TrxSpd and a raw handle position or current position of the steering control device HndlPosIn is compared to the MaxInitAngle. In particular, it is determined in step 354 whether both conditions for commencing desensitization are satisfied. One condition is whether the absolute value of the measured traction wheel/motor speed is equal to or greater than the traction speed break point, |TrxSpd|≥TrxSpdBp. The other condition is whether the absolute value of the handle or tiller angle (HndlPosIn) is less than or equal to the MaxInitAngle 322. If both conditions are true, then a status flag is set to a value (e.g., "1"). If either one of the conditions is not true, then the status flag is set to a different value (e.g., "0"). Based on the value of this status flag, steered wheel desensitization logic can determine whether desensitization of the steered wheel is activated or deactivated as described below.

If both conditions of step 354 are true, then desensitization is activated and remains activated until vehicle conditions are such that desensitization of the steered wheel is deactivated. Accordingly, in step 356, a determination is made whether |TrxSpd|≥TrxSpdBp and whether the absolute value of the HndlPosIn is less than or equal to the angle 324 of FIG. 3A. If both determinations are satisfied, then desensitization of the steered wheel remains active; but if either determination is not satisfied, then desensitization is deactivated.

Figure 4:
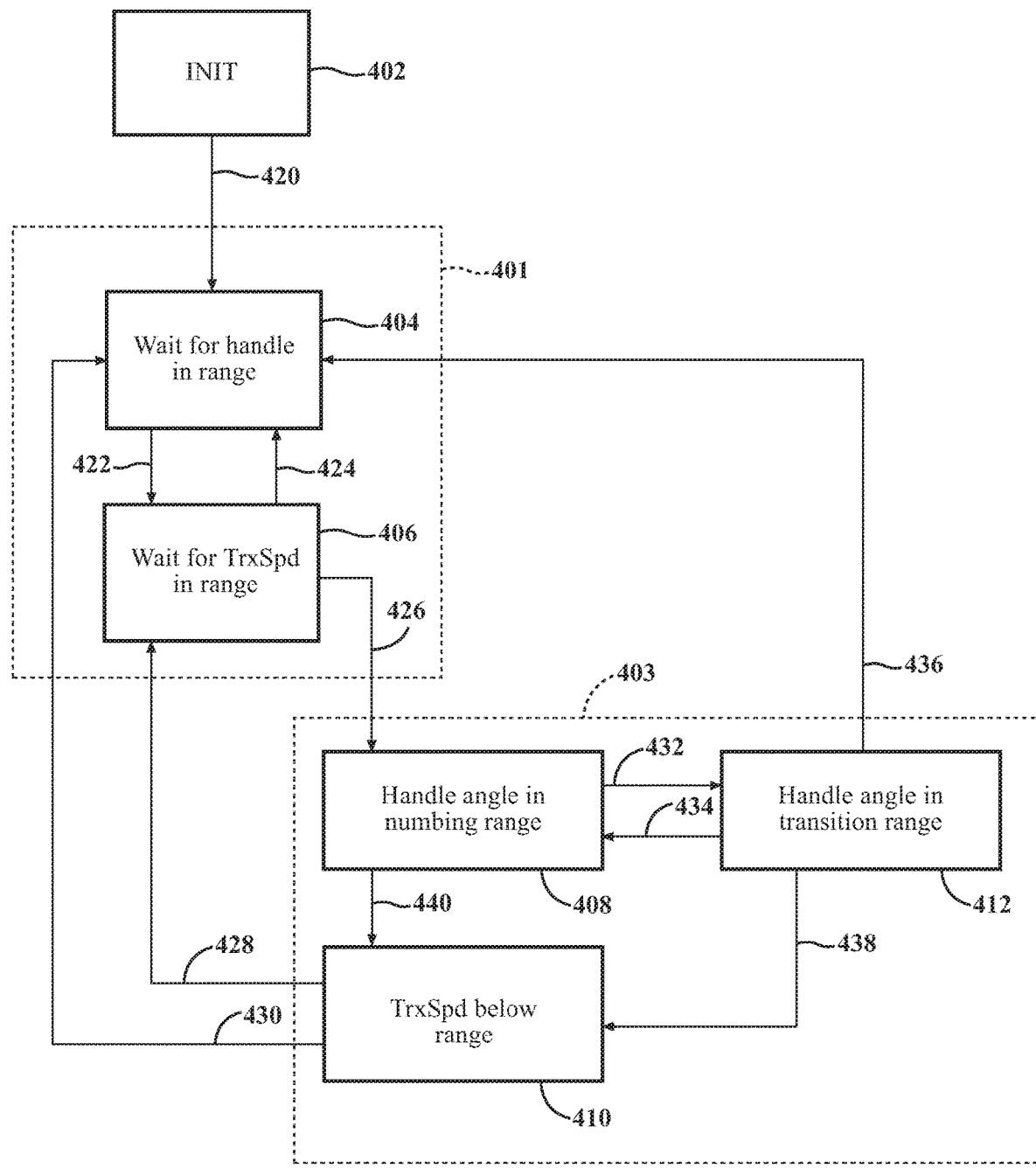
FIG. 4 depicts a state machine representation of controlling a tiller-to-wheel ratio in accordance with the principles of the present disclosure.

FIG. 4 depicts a state machine representation of controlling a tiller-to-wheel ratio in accordance with the principles of the present disclosure. One of ordinary skill will recognize that the depicted state machine is merely a model of the computational steps performed by one or more computer programs or applications executed by the processor 216 of the VCM 200. The state machine can be in one of a finite number of states. The state machine is in only one state at a time; the state it is in at any given time is called the current state. It can change from one state to another when initiated by a triggering event or condition; this is called a transition. A particular state machine is defined by a list of its states, its initial state, and the triggering condition for each transition.

Inputs to the example state machine include a raw tiller (or handle) position (or angle), the current vehicle or traction motor speed TrxSpd, the traction speed breakpoint TrxSpdBp, the maximum traction speed TrxSpdMax. The abovementioned status flag from the discussion of FIG. 3B is represented by transition 426 described below in relation to FIG. 4. The output of the state machine is a processed handle, or tiller, position. The processed handle position is used by the steering application to cause the SCM 272 to move the steered wheel angle in a desired manner.

The example state machine includes 6 states and 2 functions with one state merely being an initial state to represent how the state machine is entered. The 6 states include:
1. INITIAL 402
2. WAIT_FOR_HANDLE_IN_RANGE 404
3. WAIT_FOR_TrxSpd_IN_RANGE 406
4. HANDLE_ANGLE_IN_NUMBING_RANGE 408
5. TrxSpd_BELOW_RANGE 410
6. HANDLE_ANGLE_IN_TRANSITION_RANGE 412

The states 404-412 can be generally categorized into two sub-sets. In a first subset 401, no desensitization, or nominal operation is applied and the processed handle angle is equal to the raw handle angle. For states 408 and 412 in a second subset 403, desensitization is applied such that the processed handle angle is different than the raw handle angle.

Shortly after a vehicle is started, the state machine transitions 420 from its initial state 402 to the WAIT_FOR_HANDLE_IN_RANGE state 404. One condition for moving from the nominal subset 401 to the desensitized subset 403 in the illustrated embodiment is that the absolute value of the raw handle angle be equal to or less than the particular angle referred to as the maximum initiation angle MaxlnitAngle 322, as described above with respect to FIG. 3A and FIG. 3B. When the absolute value of the raw handle angle is greater than MaxlnitAngle, the system does not move from subset 401 (nominal) to subset 403 (desensitized) because the change from nominal to desensitized would create a noticeable adjustment of the wheel angle. It is also contemplated that, in an alternative embodiment, one condition for applying desensitization is that the absolute value of the steered wheel angle, rather than the raw handle angle, be equal to or less than a maximum initiation/commencement angle 322.

The value of MaxlnitAngle 322 is selected such that the change in the actual or real tiller-to-wheel ratio as a result of the processed handle angle output, at the time the desensitization is activated, produces an imperceptible change in the steered wheel angle, i.e., as the steered wheel moves to its updated angle. In other words, desensitization is not activated unless the angle of the steered wheel is sufficiently small such that when desensitization is initiated causing some movement of the steered wheel to an updated steered wheel position, this movement is unperceivable or nearly unperceivable as seen or experienced by the operator. The one triggering event for this state is if the absolute value of the raw handle angle becomes equal to or less than MaxlnitAngle 322, then execution proceeds with a transition 422 to the WAIT_FOR_TrxSpd_IN_RANGE state 406.

The state machine remains in the WAIT_FOR_TrxSpd_IN_RANGE state 406 until one of two triggering events occurs. One triggering event is if the absolute value of the raw handle angle increases above MaxlnitAngle 322, then the state machine transitions 424 back to the WAIT_FOR_HANDLE_IN_RANGE state 404. The other triggering event is if the magnitude of the TrxSpd is equal to or increases above, TrxSpdBp, then the state machine transitions 426 to the HANDLE_ANGLE_IN_NUMBING_RANGE state 408 and to the desensitized subset 403. The value of the status flag set as discussed above with regards to FIG. 3B provides an example technique to determine when both triggering events occur. As noted above, when both triggering events or conditions in step 354 are true, the status flag is set to a value (e.g., "1"). Accordingly, activation of desensitization will only commence when the absolute value of the raw handle angle is equal to or below MaxlnitAngle and the absolute value of the TrxSpd is greater than or equal to TrxSpdBp.

With the state machine in the HANDLE_ANGLE_IN_NUMBING_RANGE state 408, desensitization can be applied. The state machine remains in the HANDLE_ANGLE_IN_NUMBING_RANGE state 408 until one of two triggering events occur. One triggering event is if the absolute value of the TrxSpd falls below TrxSpdBp, then the state machine transitions 440 to the TrxSpd_BELOW_RANGE state 410. The other triggering event is if the absolute value of the raw handle angle increases to be equal to or above a predetermined maximum angle numbness MaxAngleNmbns 320, then the state machine transitions 432 to the HANDLE_ANGLE_IN_TRANSITION_RANGE state 412.

While the state machine is in the HANDLE_ANGLE_IN_NUMBING_RANGE state 408, an amount of desensitization applied is proportional to the magnitude of the TrxSpd such that the handle, steering control device or tiller, must realize more movement to get the same amount of movement of the steered wheel that was produced at a lower TrxSpd with less handle movement.

Figure 5:
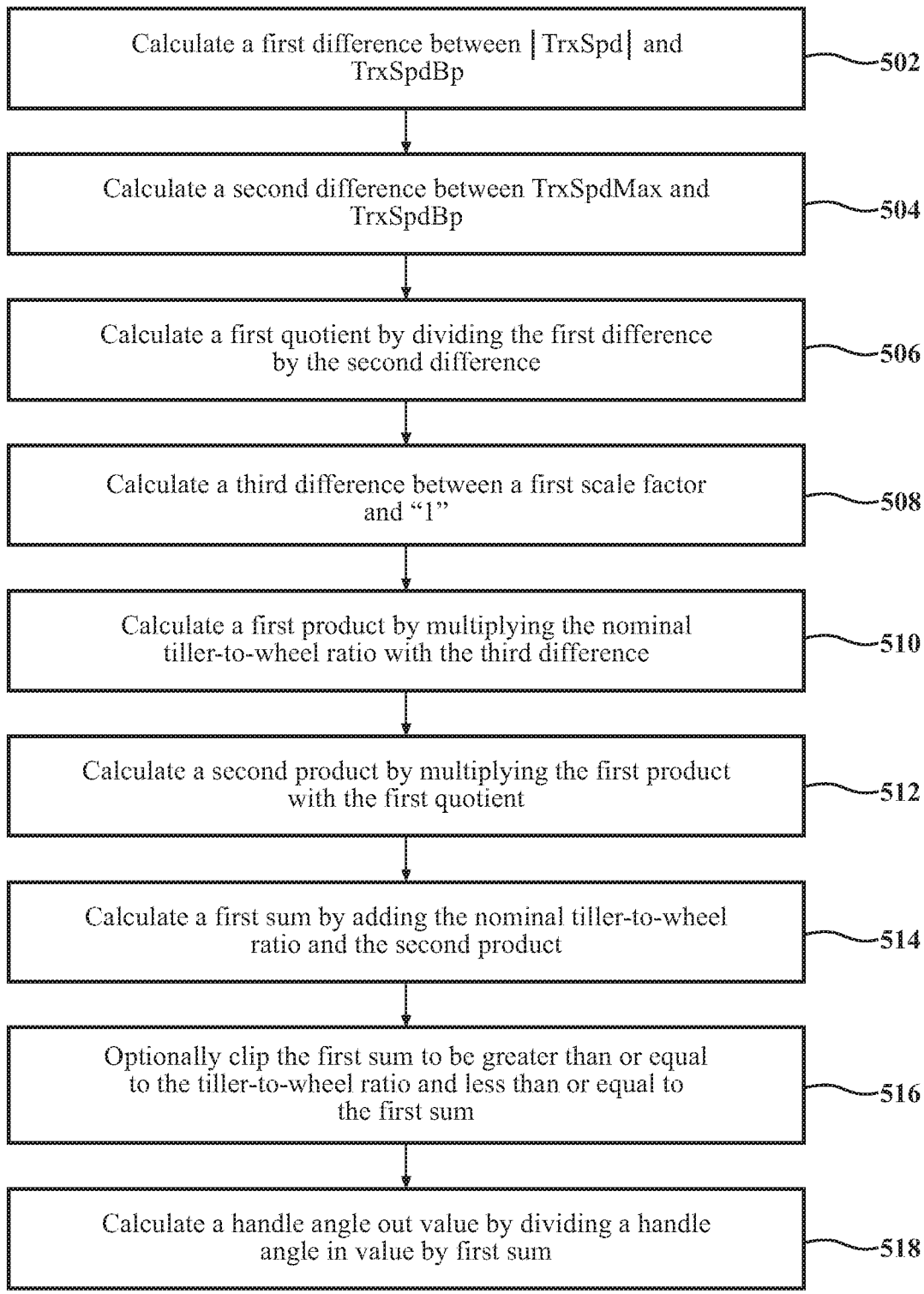
FIG. 5 depicts an example algorithm for calculating a processed handle position value while in a desensitization region in accordance with the principles of the present disclosure.

The amount of desensitization can, for example, be calculated using the steps depicted in the flowchart of FIG. 5. The inputs to this calculation include the TrxSpd, TrxSpdBp, TrxSpdMax values and a raw handle position while the output is a desensitized handle position or the processed handle angle. Other values used to generate this output include a nominal tiller-to-wheel ratio, Tlr2DuNom, which may equal the design tiller-to-wheel ratio of one of the first or the second lookup table currently being used by the steering application based on the position of the speed selection switch, and a ratio scale factor, Tlr2DuSf, that is greater than "1" and generally corresponds to a percentage that the sensitivity of the steered wheel to movement of the handle will be reduced. When the first lookup table corresponding to the high speed mode is used by the steering application, the nominal tiller-to-wheel ratio is typically "1".

In step 502, a first difference is calculated by subtracting the TrxSpdBp from the absolute value of the TrxSpd and, in step 504, a second difference is calculated by subtracting TrxSpdBp from the maximum speed TrxSpdMax. In step 506, the first difference is divided by the second difference to calculate a first quotient. This first quotient represents the fraction of the portion of the TrxSpd in the desensitization range to the entire desensitization traction speed range (i.e., from TrxSpdBp to TrxSpdMax). For example, if TrxSpdMax=12, TrxSpd=8, and TrxSpdBp=3, then the first difference is 5 and the second difference is 9. In step 506, the first difference is divided by the second difference to calculate a first quotient. This first quotient represents the portion of the TrxSpd in the desensitization range (i.e., the speed range from 8 to 3) as compared to the entire desensitization range (i.e., the speed range from 12 to 3).

In step 508 an amount that the ratio scale factor Tlr2DuSf exceeds "1" is calculated and, in step 510, this amount is multiplied with the nominal tiller-to-wheel ratio Tlr2DuNom to calculate a first product that represents the change in the tiller-to-wheel ratio that can occur during desensitization. This first product is multiplied with the first quotient, in step 512, to produce a second product that is a value that is added to the nominal tiller-to-wheel ratio, in step 514 to produce a first sum. This first sum represents a numbed or desensitized tiller-to-wheel ratio NmbnsTlr2Du. For example, if the ratio scale factor Tlr2DuSf=2.35, then 1 is subtracted from that value such that 2.35−1=1.35. This amount (1.35) is multiplied by the nominal tiller-to-wheel ratio Tlr2DuNom (1) to calculate a first product such that 1.35×1=1.35. The first product (1.35) is multiplied by the first quotient (5/9) to produce a second product such that 1.35×5/9=0.75. This second product is added to the nominal tiller-to-wheel ratio Tlr2DuNom (1) to produce a first sum such that 1+0.75=1.75, which is a numbed or desensitized tiller-to-wheel ratio. The numbed or desensitized tiller-to-wheel ratio is also referred to herein as a steering desensitization value.

Optionally, in step 516, the numbed tiller-to-wheel ratio can be clipped such that it does not exceed the nominal tiller-to-wheel ratio Tlr2DuNom multiplied by the ratio scale factor Tlr2DuSf nor does it fall below the nominal tiller-to-wheel ratio Tlr2DuNom.

The raw handle position is then divided by the numbed tiller-to-wheel ratio, in step 518, to calculate a handle position output value HndlPosOutNumbRng that is the desensitized handle position and is referred to above as the "processed handle position". The desensitized, or processed, handle position will be smaller (in magnitude) than the raw handle position reflecting that the movement of the handle by the operator is treated as if it is less than it actually is.

Hence, the steering application 206 determines the steering setpoint based on the processed handle position, i.e., the processed handle position is used as an input into one of the first or the second lookup table such that the output from the lookup table is the steering setpoint. Because the processed handle position is smaller than the raw handle position, the output from the lookup table will be smaller than a value output from the lookup table had the raw handle position been used. Hence, the steering setpoint will result in an actual or effective tiller-to-wheel ratio that is smaller than the design tiller-to-wheel ratio, resulting in the steering being desensitized.

The second product that was calculated in step 512 is dependent on the absolute value of the TrxSpd and increases as the magnitude of the TrxSpd increases which causes the first sum to increase as well. This raises the divisor value used in step 518 which decreases the processed handle position output value (i.e., the desensitized handle position). Decreasing the processed handle position output value in step 518 corresponds to reducing the sensitivity of the steered wheel to movement of the handle. In other words, if the raw handle position were actually "5" but the calculated desensitized or processed handle position value is "3.5", then less movement of the steered wheel will occur than if the raw handle position were used to control the movement of the steered wheel.

Desensitization continues in state 408 until the vehicle reaches its maximum speed as long as the handle position remains below the predetermined maximum angle numbness, MaxAngleNmbns 320. In contrast, when the speed of the vehicle decreases (but remains equal to or above TrxSpdBp), the desensitization is reduced. This trend continues until the absolute value of the TrxSpd falls below the TrxSpdBp at which point the effectively-applied tiller-to-wheel ratio transitions back to the nominal or design tiller-to-wheel ratio because the state machine transitions 440 from the HANDLE_ANGLE_IN_NUMBING_RANGE state 408 to the TrxSpd_BELOW_RANGE state 410 when the TrxSpd falls below the TrxSpdBp.

Alternatively, the state machine transitions 432 from the HANDLE_ANGLE_IN_NUMBING_RANGE state 408 to the HANDLE_ANGLE_IN_TRANSISTION_RANGE state 412 as the absolute value of the raw handle angle increases and reaches the predetermined maximum angle numbness, MaxAngleNmbns 320. Under these circumstances, it is determined that the handle has likely moved not due to vehicle motion disturbance but rather by operator intention. Thus, desensitization is gradually removed and done so in a way that is imperceptible to the operator. As described in detail below with respect to FIG. 6A, as the magnitude of the raw handle position increases further, the desensitization is gradually removed over a range of angles from the MaxAngleNmbns 320 to a larger angle 324 calculated by adding the offset value NmbnsTransAng to the MaxAngleNmbns 320, in order to once again rely on the nominal or design tiller-to-wheel ratio, i.e., the raw handle position is used as an input into one of the first or the second lookup table, once the raw handle position reaches the larger angle 324.

While in the HANDLE_IN_ANGLE_TRANSITION_RANGE state 412, three different triggering events can occur which cause the state machine to transition to a different state:

a) if the absolute value of the raw handle position is greater than the larger angle 324 (MaxAngleNmbns+NmbnsTransAng), then the state machine transitions 436 to the WAIT_FOR_HANDLE_IN_RANGE state 404 and into the nominal subset 401;

b) if the absolute value of the TrxSpd drops below TrxSpdBp, then the state machine transitions 438 to the TrxSpd_BELOW_RANGE state 410; and c) if the absolute value of the raw handle position falls below MaxAngleNmbns 320, then the state machine transitions 434 to the HANDLE_ANGLE_IN_NUMBING_RANGE state 408.

Figure 6A:
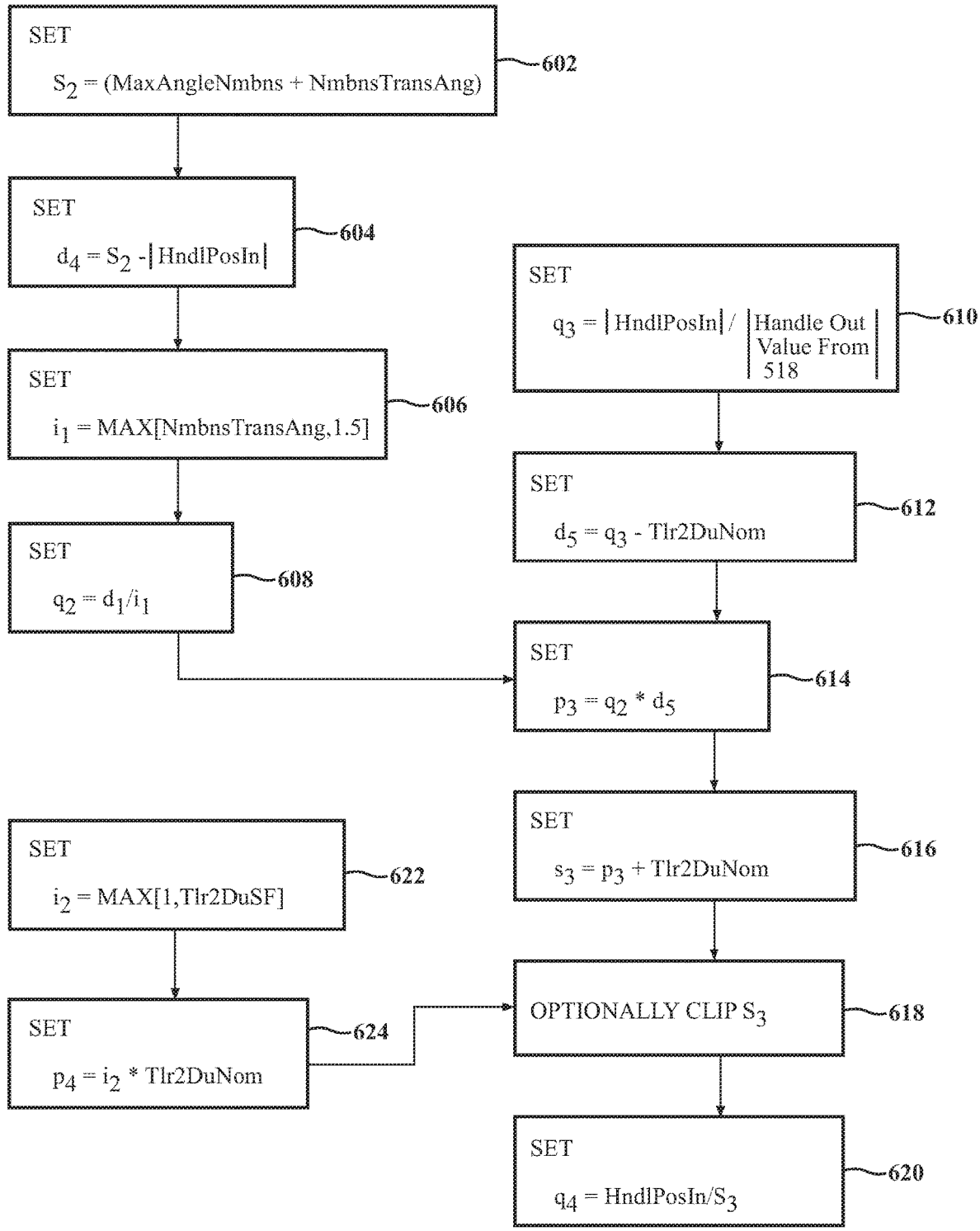
FIG. 6A depicts an example algorithm for calculating a processed handle position value while in the transition region in accordance with the principles of the present disclosure.

While in the HANDLE_IN_ANGLE_TRANSITION_RANGE state 412, desensitization is determined by TrxSpd and the raw handle position in the transition range of angles (i.e., angles between MaxAngleNmbns 320 and angle 324 (MaxAngleNmbns+NmbnsTransAng)). In other words, the removal of desensitization begins when the raw handle position reaches MaxAngleNmbns 320 and is completed when the raw handle position reaches MaxAngleNmbns+NmbnsTransAng 324. FIG. 6A depicts an example algorithm for calculating a processed handle position value while in the transition region in accordance with the principles of the present disclosure. FIG. 6B and FIG. 6C depict values from example calculations performed in accordance with FIG. 6A, where the numerical values are not actual handle position values and are used only to illustrate the steps set out in FIG. 6A.

In step 602, a second sum $s_2$ is calculated by adding MaxAngleNmbns+NmbnsTransAng and used to calculate, in step 604, a fourth difference $d_4$ by subtracting the absolute value of the raw handle position from the second sum 52. In step 606, a first intermediate value $i_1$ is determined to be the maximum of the NmbnsTransAng and "1.5". Then, in step 608, a second quotient $q_2$ is calculated by dividing $d_1$ by $i_1$. The second quotient $q_2$ generally represents an amount of the transition region remaining for the handle position to travel through. As the raw handle position approaches MaxAngleNmbns+NmbnsTransAng, the second quotient $q_2$ becomes smaller.

In step 610, a third quotient $q_3$ is determined by dividing the absolute value of the raw handle position |HndlPosIn| by the absolute value of the handle position output value |HndlPosNumbRngOut| which is calculated according to the flowchart of FIG. 5 and output in step 518. The third quotient $q_3$ is used in step 612 to calculate a fifth difference, $d_5$, by subtracting the Tlr2DuNom from the third quotient $q_3$.

This difference $d_5$ represents a maximum amount of desensitization that can be applied based on the current traction speed TrxSpd of the vehicle or traction motor. In step 614, this difference $d_5$ is scaled based on the second quotient $q_2$ to produce a third product $p_3$. Thus, when the raw handle position is at MaxAngleNmbns 320, $p_3$ is at its largest; and when the raw handle position is at MaxAngleNmbns+NmbnsTransAng 324, $p_3$ is at or near "0".

In step 616, a third sum $s_3$ is calculated by adding the third product $p_3$ to the nominal tiller-to-wheel ratio Tlr2DuNom. In step 618, the third sum $s_3$ can be optionally clipped so as to be at least Tlr2DuNom and no greater than a value calculated in step 624.

In step 622, a second intermediate value $i_2$ is determined to be the maximum of "1" and the ratio scale factor Tlr2DuSf. Accordingly, in step 624, a fourth product $p_4$ can be calculated by multiplying the second intermediate value $i_2$ by the nominal tiller-to-wheel ratio Tlr2DuNom and is used as the upper clip limit for the modified tiller-to-wheel ratio.

In step 620 a fourth quotient $q_4$ is calculated by dividing the raw handle position by the third sum $s_3$. The fourth quotient $q_4$ is the processed handle position that is output by the state machine and used by the steering application to determine the steering setpoint. In step 614, as the value of the third product $p_3$ approaches "0", then the third sum $s_3$ approaches the nominal tiller-to-wheel ratio. As mentioned above, at relatively high speeds, this ratio is typically "1" such that at the upper edge of the transition region, the fourth quotient $q_4$, or the processed handle position, is equal to the raw handle position and, thus, desensitization has been removed.

FIG. 6B depicts values from example calculations performed in accordance with FIG. 6A, where the numerical values are not actual handle position values and are used only to illustrate the steps set out in FIG. 6A. In the example of FIG. 6B, TrxSpd is 100% of the TrxSpdMax, MaxAngleNmbns is "2", NmbnsTransAng is "4", Tlr2DuSF is "2.35", and Tlr2DuNom is "1". The second column shows the raw handle position increasing from "2" (i.e., MaxAngleNmbns) to "6" (i.e., MaxAngleNmbns+NmbnsTransAng). Each of the other columns correspond to one of the steps of the flowchart of FIG. 6A. The right-most column shows the processed handle position as compared to its corresponding raw handle position wherein each processed handle position is calculated by dividing each corresponding raw handle position by the appropriate value in the column labeled "STEP 616". As can be seen in FIG. 6B, as the raw handle position increases from "2" to "6", the values in the column labeled "STEP 616" decrease from Tlr2DuSF to Tlr2DuNom such that when the raw handle position is "6" desensitization of the handle position has been removed (i.e., the processed handle position equals the raw handle position.)

FIG. 6C depicts values from example calculations performed in accordance with FIG. 6A, where the numerical values are not actual handle position values and are used only to illustrate the steps set out in FIG. 6A. In the example of FIG. 6C, TrxSpd is 75% of the TrxSpdMax and all the other parameters are the same as in FIG. 6B. The second column shows the raw handle position increasing from "2" (i.e., MaxAngleNmbns) to "6" (i.e., MaxAngleNmbns+NmbnsTransAng). Each of the other columns correspond to one of the steps of the flowchart of FIG. 6A. The right-most column shows the processed handle position as compared to its corresponding raw handle position wherein each processed handle position is calculated by dividing each corresponding raw handle position by the appropriate value in the column labeled "STEP 616". As can be seen in FIG. 6C, as the raw handle position increases from "2" to "6", the values in the column labeled "STEP 616" decrease from "1.9" to Tlr2DuNom (i.e., "1") such that when the raw handle position is "6" desensitization of the handle position has been removed (i.e., the processed handle position equals the raw handle position.) Comparing the right-most columns of FIGS. 6B and 6C, the processed handle positions in FIG. 6C are larger than a corresponding processed handle position in FIG. 6B which means that FIG. 6B represents greater desensitization of the steered wheel as compared to FIG. 6C. Thus, as the TrxSpd of the vehicle decreases, the amount of desensitization decreases as well.

When the state machine is in the TrxSpd_BELOW_RANGE state 410, there are two triggering conditions that cause transitions to another state. One of the two triggering conditions will be true so the state machine does not remain in the TrxSpd_BELOW_RANGE state 410 but will always transition (428, 430) to a state in the subset 401. Thus, even though the TrxSpd_BELOW_RANGE state 410 is in the subset 403 in FIG. 4, the processed handle position output while in this state equals the raw handle position. If the absolute value of the raw handle position is equal to or less than MaxInitAngle, then the state machine transitions 428 to the WAIT_FOR_TrxSpd_IN_RANGE state 406. If the absolute value of the raw handle position is greater than MaxInitAngle, then the state machines transitions 430 to the WAIT_FOR_HANDLE_IN_RANGE state 404.

Figure 7:
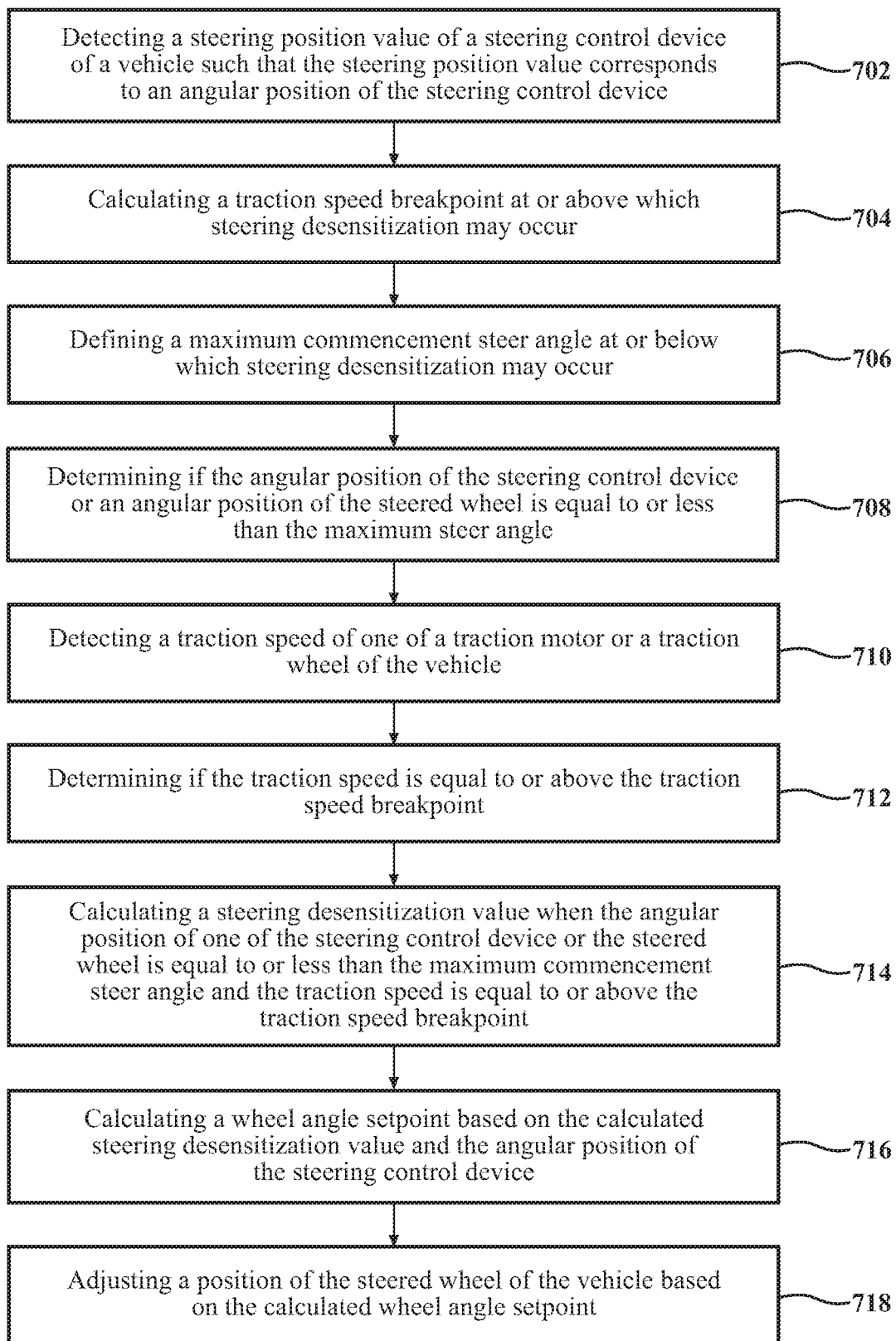
FIG. 7 is a flowchart of an example method for implementing steering desensitization in accordance with the principles of the present disclosure.

FIG. 7 is a flowchart of an example method for implementing steering desensitization in accordance with the principles of the present disclosure. In step 702, a steering position value of a steering control device of a vehicle is detected such that the steering position value corresponds to an angular position of the steering control device. Next, in step 704, a traction speed breakpoint TrxSpdBp is calculated, at or above which steering desensitization may occur. However, applying steering desensitization is also based on the steered wheel angle or the detected steering position value of the steering control device. Thus, in step 706, a maximum commencement steer angle MaxInitAngle is defined, at or below which steering desensitization may be activated or commenced. In step 708, a determination is made as to whether the angular position (magnitude) is equal to or less than the maximum commencement steer angle MaxInitAngle. In step 710 an absolute value of the traction speed TrxSpd of one of a traction motor or a traction wheel of the vehicle is detected so that it can be determined in step 712 if the magnitude of the traction speed TrxSpd is equal to or above the traction speed breakpoint TrxSpdBp.

In step 714, a steering desensitization value can start being calculated when the angular position is equal to or less than the maximum commencement steer angle MaxInitAngle and the desensitization value continues to be calculated while the angular position remains below MaxAngleNmbns+NmbnsTransAng and the magnitude of the traction speed TrxSpd is equal to or above the traction speed breakpoint TrxSpdBp. A processed angular position can be calculated that is based on the steering desensitization value and the angular position of the steering control device. The processed angular position, rather than the calculated angular position, can be used in step 716 to calculate a wheel angle setpoint. Ultimately, in step 718, a position of the steered wheel, $\omega_2$ or $\theta_2$, of the vehicle can be adjusted to match the calculated wheel angle setpoint according to a delaying filter based on the traction speed of the vehicle TrxSpd. Thus, the steering system can position the steered wheel per the operator command as quickly as possible without operator perceived delay, but in order to improve operating stability, the steering application 206 of the VCM 200 may not immediately issue the calculated wheel angle setpoint to the SCM 272 based on the traction wheel/motor speed feedback or Trx_Speed but rather apply a slight delay. For example, a delay of less than 200 ms.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A processor implemented method for adjusting a position of a steered wheel of a vehicle comprising:
    detecting, by a processor, a steering position value of a steering control device of the vehicle such that the steering position value corresponds to an angular position of the steering control device;

calculating, by the processor, a traction speed breakpoint at or above which steering desensitization may occur;

defining, by the processor, a maximum commencement steer angle at or below which steering desensitization may commence;

determining, by the processor, if the angular position of the steering control device or an angular position of the steered wheel is equal to or less than the maximum commencement steer angle;

detecting, by the processor, a traction speed of one of a traction motor or a traction wheel of the vehicle;

determining, by the processor, if the traction speed is equal to or above the traction speed breakpoint;

calculating, by the processor, a steering desensitization value when the angular position of one of the steering control device or the steered wheel is equal to or less than the maximum commencement steer angle and the traction speed is equal to or above the traction speed breakpoint;

calculating, by the processor, a wheel angle setpoint based on the calculated steering desensitization value and the angular position of the steering control device; and adjusting the position of the steered wheel of the vehicle based on the calculated wheel angle setpoint.

2. The method of claim 1, wherein calculating the wheel angle setpoint comprises using a look-up table or function having an input value and an output value, wherein:
the input value is based on the steering position value; and
the wheel angle setpoint is based on the output value.

3. The method of claim 2, comprising:
calculating a modified steering position value by dividing the steering position value by the steering desensitization value, wherein the input value is the modified steering position value.

4. The method of claim 3, wherein the output value is the wheel angle setpoint.

5. The method of claim 1, wherein the steering desensitization value varies based on the traction speed.

6. The method of claim 5, wherein the steering desensitization value varies in proportion to the traction speed.

7. The method of claim 6, wherein the steering desensitization value is calculated while the traction speed remains at or above the traction speed breakpoint and the angular position of the steering control device remains below a maximum desensitization angle that is larger than the maximum commencement steer angle.

8. The method of claim 1, wherein a scale factor is used to modify a nominal steering control device-to-wheel ratio to calculate an adjusted steering control device-to-wheel ratio.

9. The method of claim 8, wherein the steering desensitization value is based on the adjusted steering control device-to-wheel ratio multiplied by a quotient that varies based on the traction speed.

10. The method of claim 1, comprising:
detecting a transition region, by the processor, when the angular position of the one of the steering control device or the steered wheel is at or above a maximum numbness angle but within a predetermined angular range from the maximum numbness angle.

11. The method of claim 10, wherein in the transition region, the steering desensitization value varies in an inverse proportion to the angular position of the one of the steering control device or the steered wheel.

12. The method of claim 10, wherein in the transition region, the steering desensitization value varies in proportion to the traction speed.

13. A system for adjusting a position of a steered wheel of a vehicle comprising:
a memory device storing executable instructions; and
a processor in communication with the memory device, wherein the processor when executing the executable instructions:
detects a steering position value of a steering control device of the vehicle such that the steering position value corresponds to an angular position of the steering control device;
calculates a traction speed breakpoint at or above which steering desensitization may occur;
defines a maximum commencement steer angle at or below which steering desensitization may commence;
determines if the angular position of the steering control device or an angular position of the steered wheel is equal to or less than the maximum commencement steer angle;
detects a traction speed of one of a traction motor or a traction wheel of the vehicle;
determines if the traction speed is equal to or above the traction speed breakpoint;
calculates a steering desensitization value when the angular position of one of the steering control device or the steered wheel is equal to or less than the maximum commencement steer angle and the traction speed is equal to or above the traction speed breakpoint;
calculates a wheel angle setpoint based on the calculated steering desensitization value and the angular position of the steering control device; and
adjusts the position of the steered wheel of the vehicle based on the calculated wheel angle setpoint.

14. The system of claim 13, wherein the processor, when calculating the wheel angle setpoint, uses a look-up table or function having an input value and an output value, wherein:
the input value is based on the steering position value; and
the wheel angle setpoint is based on the output value.

15. The system of claim 14, wherein the processor when executing the executable instructions:
calculates a modified input value by dividing the steering position value by the steering desensitization value, wherein the input value is the modified input value.

16. The system of claim 15, wherein the output value is the wheel angle setpoint.

17. The system of claim 13, wherein the steering desensitization value varies based on the traction speed.

18. The system of claim 17, wherein the steering desensitization value varies in proportion to the traction speed.

19. The system of claim 18, wherein the steering desensitization value is calculated while the traction speed remains at or above the traction speed breakpoint and the angular position of the steering control device remains below a maximum desensitization angle that is larger than the maximum commencement steer angle.

20. The system of claim 13, wherein a scale factor is used to modify a nominal steering control device-to-wheel ratio to calculate an adjusted steering control device-to-wheel ratio.

21. The system of claim 20, wherein the steering desensitization value is based on the adjusted steering control device-to-wheel ratio multiplied by a quotient that varies based on the traction speed.

22. The system of claim 13, wherein the processor, when executing the executable instructions:

detects a transition region when the angular position of the one of the steering control device or the steered wheel is at or above a maximum numbness angle but within a predetermined angular range from the maximum numbness angle.

23. The system of claim 22, wherein in the transition region, the steering desensitization value varies in an inverse proportion to the angular position of the one of the steering control device or the steered wheel.

24. The system of claim 22, wherein in the transition region, the desensitization value varies in proportion to the traction speed.

25. The method of claim 1, wherein the steered wheel and the traction wheel comprise the same wheel.

26. The system of claim 13, wherein the steered wheel and the traction wheel comprise the same wheel.

* * * * *